(12) United States Patent
Iwami et al.

(10) Patent No.: US 10,198,986 B2
(45) Date of Patent: Feb. 5, 2019

(54) INFORMATION PROCESSING DEVICE AND INFORMATION PROCESSING METHOD

(71) Applicant: SONY CORPORATION, Tokyo (JP)

(72) Inventors: Hideki Iwami, Saitama (JP); Masanori Sato, Tokyo (JP); Osamu Yoshimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 27 days.

(21) Appl. No.: 14/890,201

(22) PCT Filed: Apr. 4, 2014

(86) PCT No.: PCT/JP2014/059937
§ 371 (c)(1),
(2) Date: Nov. 10, 2015

(87) PCT Pub. No.: WO2014/192415
PCT Pub. Date: Dec. 4, 2014

(65) Prior Publication Data
US 2016/0111039 A1 Apr. 21, 2016

(30) Foreign Application Priority Data
May 31, 2013 (JP) .................... 2013-115851

(51) Int. Cl.
*H04N 21/4363* (2011.01)
*H04N 21/443* (2011.01)
(Continued)

(52) U.S. Cl.
CPC ..... *G09G 3/2092* (2013.01); *H04N 21/43637* (2013.01); *H04N 21/4436* (2013.01);
(Continued)

(58) Field of Classification Search
CPC .......... G09G 3/2092; G09G 2330/021; G09G 2370/16; H04N 21/43637; H04N 21/44231; H04N 21/4436
See application file for complete search history.

(56) References Cited

U.S. PATENT DOCUMENTS

| | | | | |
|---|---|---|---|---|
| 2007/0222769 A1* | 9/2007 | Otsuka | ................. | G01C 21/265 345/173 |
| 2010/0009725 A1* | 1/2010 | Banerjea | ........... | H04W 52/0216 455/574 |

(Continued)

FOREIGN PATENT DOCUMENTS

| | | |
|---|---|---|
| CN | 102089932 A | 6/2011 |
| EP | 2285068 A1 | 2/2011 |

(Continued)

OTHER PUBLICATIONS

Extended European Search Report of EP Patent Application No. 14803531.4, dated Nov. 8, 2016, 11 pages.

(Continued)

*Primary Examiner* — Jacinta M Crawford
(74) *Attorney, Agent, or Firm* — Chip Law Group

(57) ABSTRACT

An information processing device is an information processing device that receives a stream for outputting image information from another information processing device through wireless communication, and includes a wireless communication unit and a control unit. The wireless communication unit performs communication with another information processing device so as to exchange the capability information about the information processing device and the capability information about the other information processing device. The control unit sets a power consumption mode in the other information processing device based on the capability information about the other information processing device.

19 Claims, 21 Drawing Sheets

(51) Int. Cl.
  *G09G 3/20* (2006.01)
  *H04N 21/442* (2011.01)
(52) U.S. Cl.
  CPC . *H04N 21/44231* (2013.01); *G09G 2330/021* (2013.01); *G09G 2370/16* (2013.01)

(56) References Cited

U.S. PATENT DOCUMENTS

| | | | | |
|---|---|---|---|---|
| 2011/0117971 | A1* | 5/2011 | Kim | G06F 1/1647 455/566 |
| 2011/0225307 | A1* | 9/2011 | George | H04L 69/10 709/227 |
| 2012/0195227 | A1 | 8/2012 | Vedantham et al. | |
| 2013/0002949 | A1* | 1/2013 | Raveendran | H04W 28/18 348/469 |
| 2013/0234913 | A1* | 9/2013 | Thangadorai | G06F 3/1423 345/2.1 |
| 2014/0285498 | A1* | 9/2014 | Kim | G06F 1/1601 345/501 |

FOREIGN PATENT DOCUMENTS

| | | |
|---|---|---|
| JP | 2007-174297 A | 7/2007 |
| JP | 2008-199260 A | 8/2008 |
| JP | 2008-278388 A | 11/2008 |
| JP | 2009-118361 A | 5/2009 |
| JP | 2009-267823 A | 11/2009 |
| JP | 2010-011277 A | 1/2010 |
| JP | 2010-279042 A | 12/2010 |
| KR | 20110092713 A | 8/2011 |
| WO | 03/029989 A1 | 4/2003 |
| WO | 2003/029989 A1 | 4/2003 |
| WO | 2003029989 A1 | 4/2003 |
| WO | 2006/070647 A1 | 7/2006 |
| WO | 2006070847 A1 | 7/2006 |

OTHER PUBLICATIONS

"Wi-Fi Display Technical Specification Version 1.0.0", 2012, 149 pages.
"Wi-Fi Alliance Member Symposium", 92 pages.
Office Action for KR Patent Application No. 10-2015-7032924, dated Jan. 10, 2017, 5 pages of Office Action and 4 pages of English Translation.
Office Action for JP Patent Application No. 2015-519726, dated Feb. 27, 2018, 06 pages of Office Action and 03 pages of English Translation.
Office Action for JP Patent Application No. 2015-519726, dated May 29, 2018, 04 pages of Office Action and 03 pages of English Translation.
Office Action for CN Patent Application No. 201480031656.8, dated Oct. 9, 2018, 5 pages of Office Action and 8 pages of English Translation.

* cited by examiner

FIG. 4

MANAGEMENT INFORMATION HOLDING UNIT
390

| TERMINAL IDENTIFICATION INFORMATION | FREQUENCY CHANNEL | RADIO WAVE PROPAGATION MEASUREMENT INFORMATION | | | | | DEVICE INFORMATION | BAND USAGE LEVEL | OUTPUT FORMAT | STANDBY/ WAKEUP |
| --- | --- | --- | --- | --- | --- | --- | --- | --- | --- | --- |
| | | PER | BER | NUMBER OF PACKET RETRANSMISSIONS | THROUGHPUT | DROP FRAME | SIR (RSSI) | | | | |
| DSC200 | 60GHz | ... | ... | ... | ... | ... | ... | MOBILE | 20Mbps | SUB | STANDBY |
| DR400 | 2.4GHz | ... | ... | ... | ... | ... | ... | STATIONARY | 20Mbps | MAIN | WAKEUP |

391  392  393  394  395  396  397

FIG. 5
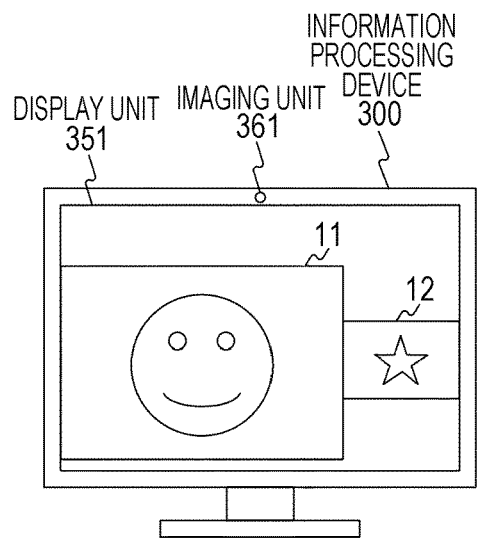
a
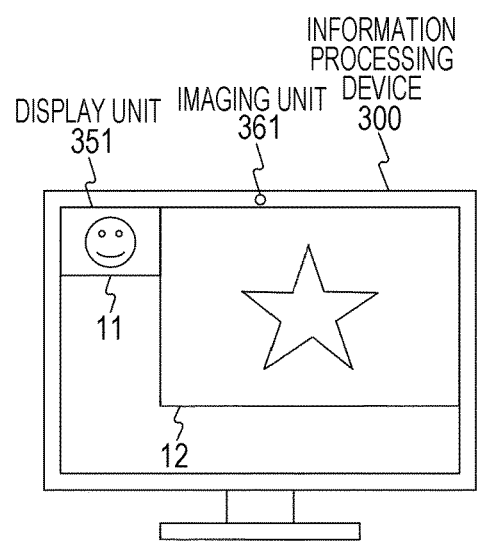
b

EXAMPLE OF MODE SETTING UNDER CONTROL OF SOURCE DEVICE

INFORMATION PROCESSING DEVICE AND INFORMATION PROCESSING METHOD

TECHNICAL FIELD

The present technology relates to information processing devices. More particularly, the present technology relates to an information processing device and an information processing method for exchanging various kinds of information through wireless communication.

BACKGROUND ART

There have been wireless communication techniques for exchanging various kinds of data through wireless communication. For example, an information exchange device that exchanges various kinds of data through wireless communication between two wireless communication devices has been suggested (see Patent Document 1, for example).

CITATION LIST

Patent Document

Patent Document 1: JP 2008-278388 A

SUMMARY OF THE INVENTION

Problems to be Solved by the Invention

By the above described conventional technology, it is possible to exchange various kinds of data through wireless communication between two wireless communication devices that are not connected to each other by a wired line. For example, an image based on image data transmitted from the information processing device on the transmitting side can be displayed on the display unit of the information processing device on the receiving side.

It can be also assumed that there exists more than one information processing device on the transmitting side, and images based on image data transmitted from these information processing devices are displayed on the display unit of the information processing device on the receiving side, for example. In such a case, it is critical to perform appropriate power consumption mode control in accordance with the communication status.

The present technology has been made in view of those circumstances, and aims to perform appropriate power consumption mode control.

Solutions to Problems

The present technology has been developed to solve the above described problem, and a first aspect thereof lies in an information processing device that receives a stream for outputting image information from another information processing device through wireless communication, and including: a wireless communication unit that performs communication with the other information processing device so as to exchange capability information about the information processing device and capability information about the other information processing device; and a control unit that performs control to set a power consumption mode in the other information processing device based on the capability information about the other information processing device. The first aspect also lies in an information processing method in the information processing device, and a program for causing a computer to implement the information processing method. With this, a power consumption mode is set in the other information processing device based on the capability information about the other information processing device.

In the first aspect, the capability information about the other information processing device may include information indicating whether the other information processing device is a mobile device, and the control unit may perform control to set a low power consumption mode in the other information processing device based on the capability information about the other information processing device and management information for managing the other information processing device. With this, the low power consumption mode is set in the other information processing device based on the capability information about the other information processing device and the management information for managing the other information processing device.

In the first aspect, the management information may be information for managing identification information for identifying the other information processing device and the capability information about the other information processing device, the identification information and the capability information being connected to each other. With this, the management information for managing the identification information for identifying the other information processing device and the capability information about the other information processing device is generated, with the identification information and the capability information being connected to each other.

In the first aspect, the management information may include, as the capability information about the other information processing device, at least information about radio wave propagation measurement related to communication with the other information processing device and information about power consumption. With this, the management information that includes at least the information about radio wave propagation measurement related to communication with the other information processing device and the information about power consumption as the capability information about the other information processing device is generated.

In the first aspect, the management information may include, as the capability information about the other information processing device, at least information about an output format for displaying the image information. With this, the management information that includes at least the information about the output format for displaying the image information as the capability information about the other information processing device is used.

In the first aspect, the information about the output format may be information indicating that the image information is of main display or of sub display, and, when the output format is of the sub display, the control unit may set the low power consumption mode in the other information processing device. With this, when the output format is of the sub display, the low power consumption mode is set in the other information processing device.

In the first aspect, when switching between the main display and the sub display is performed, the other information processing device may transmit information indicating the timing of the switching to the information processing device. With this, when switching between the main display and the sub display is performed, the other information processing device transmits the information indicating the timing of the switching to the information processing device.

In the first aspect, the control unit may perform control to set a mode for the other information processing device to transmit the stream while sleeping at predetermined intervals, the mode being set as the low power consumption mode. With this, the mode for the other information processing device to transmit the stream while sleeping at predetermined intervals is set as the low power consumption mode.

In the first aspect, the setting of a power consumption mode may be performed with a predetermined RTSP message defined in the Wi-Fi Display specifications. With this, the setting of a power consumption mode is performed with the predetermined RTSP message defined in the Wi-Fi Display specifications.

In the first aspect, the wireless communication unit may perform exchange of the capability information through capability negotiation or capability re-negotiation defined in the Wi-Fi Display specifications. With this, exchange of the capability information is performed through capability negotiation or capability re-negotiation defined in the Wi-Fi Display specifications.

In the first aspect, the capability information may be exchanged in a RTSP M3 Message in capability negotiation or capability re-negotiation. With this, the capability information is exchanged in the RTSP M3 Message in capability negotiation or capability re-negotiation.

In the first aspect, the wireless communication unit may be a wireless communication unit that performs communication using a first frequency band and communication using a second frequency band having a higher data transmission rate than the first frequency band, and the control unit may set a first power consumption mode for the first frequency band and a second power consumption mode for the second frequency band independently of each other. With this, the first power consumption mode for the first frequency band and the second power consumption mode for the second frequency band are set independently of each other.

In the first aspect, when the management information is changed, the control unit may perform control to transmit a command to the another information processing device, the command being for notifying the another information processing device of the change. With this, when the management information is changed, the command for notifying the other information processing device of the change is transmitted to the other information processing device.

In the first aspect, the control unit may perform control to transmit a RTSPM5 Message as the command to the other information processing device, the RTSPM5 Message containing wfd-triggered-method defined in the Wi-Fi CERTIFIED Miracast specifications. With this, the RTSPM5 Message containing wfd-triggered-method defined in the Wi-Fi CERTIFIED Miracast specifications is transmitted to the other information processing device.

A second aspect of the present technology lies in an information processing device that receives a stream for outputting image information from another information processing device through wireless communication, and performs control to set a power consumption mode in the other information processing device based on the output format of an output unit that outputs the image information based on the stream. The second aspect also lies in an information processing method in the information processing device, and a program for causing a computer to implement the information processing method. With this, a power consumption mode is set in the other information processing device based on the output format of the output unit that outputs the image information based on the stream.

A third aspect of the present technology lies in an information processing device that transmits a stream for outputting image information from another information processing device through wireless communication, and including: a wireless communication unit that performs communication with the other information processing device so as to exchange capability information about the information processing device and capability information about the other information processing device; and a control unit that sets a power consumption mode under the control of the other information processing device based on the capability information about the information processing device. The third aspect also lies in an information processing method in the information processing device, and a program for causing a computer to implement the information processing method. With this, a power consumption mode is set under the control of the other information processing device based on the capability information about the information processing device.

Effects of the Invention

According to the present technology, an excellent effect to realize appropriate power consumption mode control can be achieved.

BRIEF DESCRIPTION OF DRAWINGS

FIG. 4 is a diagram schematically showing an example of the contents of the information held in a management information holding unit 390 in the first embodiment of the present technology.

FIG. 5 is a diagram showing an example of transition of images displayed on a display unit 351 of the information processing device 300 in the first embodiment of the present technology.

MODES FOR CARRYING OUT THE INVENTION

The following is a description of modes (hereinafter referred to as embodiments) for carrying out the present technology. Explanation will be made in the following order.

1. First embodiment (an example where control on wireless communication is performed based on user information and management information)

2. Second embodiment (an example where an appropriate frequency channel is set for a source device that can use more than one frequency channel)

3. Applications

1. First Embodiment

[Example Configuration of a Communication System]

Figure 1:
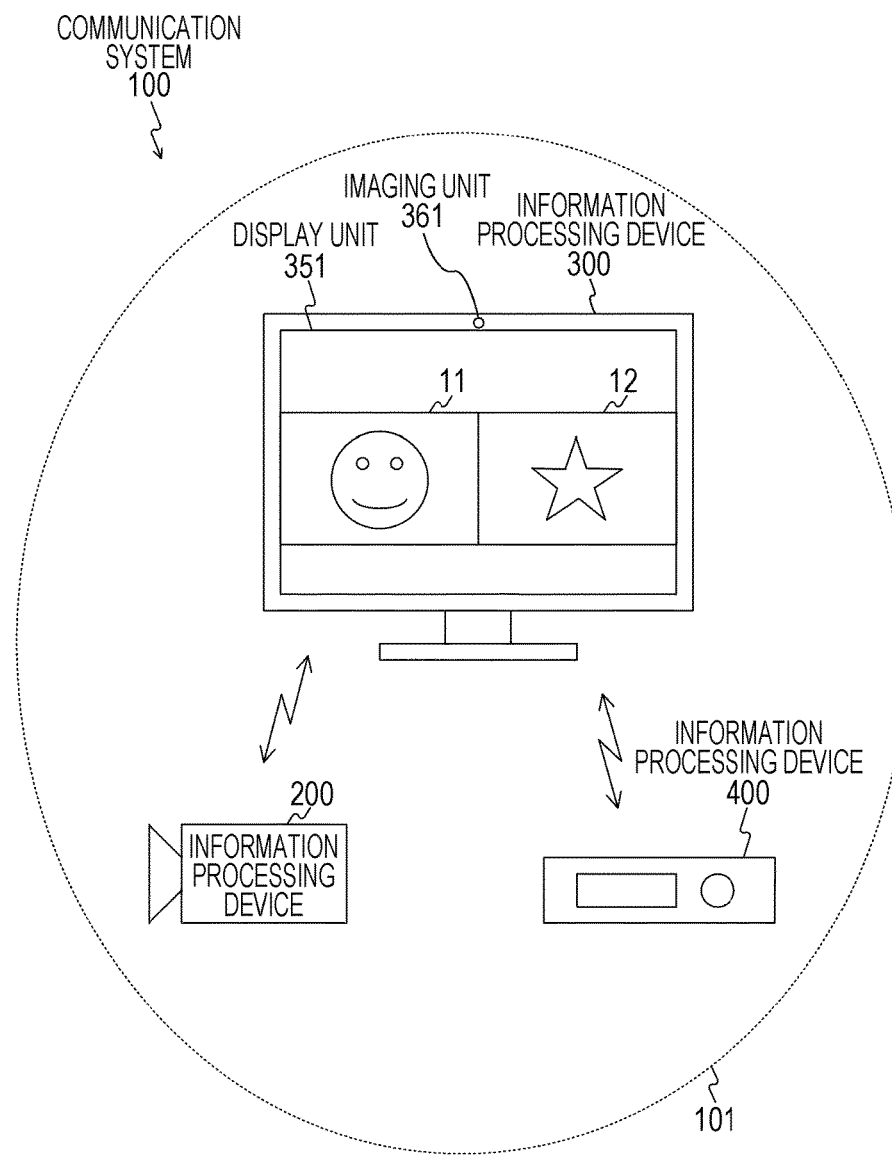
FIG. 1 is a block diagram showing an example system configuration of a communication system 100 in a first embodiment of the present technology.

FIG. 1 is a block diagram showing an example system configuration of a communication system 100 in a first embodiment of the present technology.

The communication system 100 includes an information processing device 200, an information processing device 300, and an information processing device 400. Also, the communication system 100 is a communication system in which the information processing device 300 receives data (such as image data or audio data) transmitted from at least one of the information processing devices 200 and 400.

The information processing devices 200, 300, and 400 are transmitting and receiving devices having a wireless communication function. For example, the information processing devices 200, 300, and 400 are display devices having a wireless communication function (personal computers, for example), or portable information processing devices (such as smartphones or tablet terminals). Also, the information processing devices 200, 300, and 400 are wireless communication devices compliant with Institute of Electrical and Electronics Engineers (IEEE) 802.11, 802.15, or 802.16, or the 3GPP specifications (such as Wideband Code Division Multiple Access (W-CDMA), Global System for Mobile Communications (GSM (registered trademark)), Long Term Evolution (LTE), or LTE-A (Advanced)), for example. The information processing devices 200, 300, and 400 can exchange various kinds of information, using the wireless communication function.

An example case where wireless communication using a wireless Local Area Network (LAN) is conducted between the information processing device 200 and the information processing device 300, or between the information processing device 400 and the information processing device 300 is now described.

This wireless LAN may be Wireless Fidelity (Wi-Fi) Direct, Tunneled Direct Link Setup (TDLS), or ad-hoc network, for example. The near-field wireless Audio Visual (AV) transmission communication to be used in the communication system 100 may be Wi-Fi CERTIFIED Miracast, for example. Wi-Fi CERTIFIED Miracast is a mirroring technique for transmitting the sound and the display image to be reproduced at one of the terminals to the other one of the terminals, and causing the other terminal to output the sound and the image data too, using a technique such as Wi-Fi Direct or TDLS.

By Wi-Fi CERTIFIED Miracast, User Input Back Channel (UIBC) is realized with Transmission Control Protocol/Internet Protocol (TCP/IP). UIBC is a technique for transmitting operating information about an input device such as a mouse or a keyboard from one terminal to the other terminal. Instead of Wi-Fi CERTIFIED Miracast, some other remote desktop software (such as Virtual Network Computing (VNC)) may be used.

Wi-Fi CERTIFIED Miracast specifies that images (video images) are compressed and decompressed with the use of H.264, for example. By Wi-Fi CERTIFIED Miracast, H.264 can be adjusted on the transmitting side, for example. It is possible to cope not only with H.264 but also with various kinds of codecs such as H.265 (high efficiency video coding (HEVC), scalable video coding extensions of high efficiency video coding (SHVC), for example), Moving Picture Experts Group (MPEG) 4, Joint Photographic Experts Group (JPEG) 2000, or a line base codec.

The first embodiment of the present technology shows an example where the information processing device 200 is to transmit image data and audio data that have been generated through an imaging operation. The first embodiment of the present technology also shows an example where the information processing device 400 is to transmit the content (such as content formed with image data and audio data) stored in a storage unit (such as a hard disk). The information processing device 200 may be an electronic device equipped with a camera (such as a personal computer, a gaming machine, a smartphone, or a tablet terminal). The information processing device 300 may be an electronic device equipped with a display unit (such as an imaging device, a gaming machine, a smartphone, or a tablet terminal).

For example, image data generated through an imaging operation performed by the information processing device 200 is transmitted to the information processing device 300, and an image 11 based on the image data is displayed on the display unit 351 of the information processing device 300. Also, the content stored in the storage unit (such as a hard disk) of the information processing device 400 is transmitted to the information processing device 300, and an image 12 based on the content is displayed on the display unit 351 of the information processing device 300.

As described above, the first embodiment of the present technology shows an example where the information processing devices on the source side (the source devices) are the information processing devices 200 and 400, and the information processing device on the sink side (the sink device) is the information processing device 300.

In FIG. 1, the range in which the information processing device 300 can perform direct communication using wireless communication (or the information transmission range (service range) in a case where the information processing device 300 is the reference device) is shown as an information transmission range 101.

[Example Structure of an Information Processing Device (a Source Device)]

Figure 2:
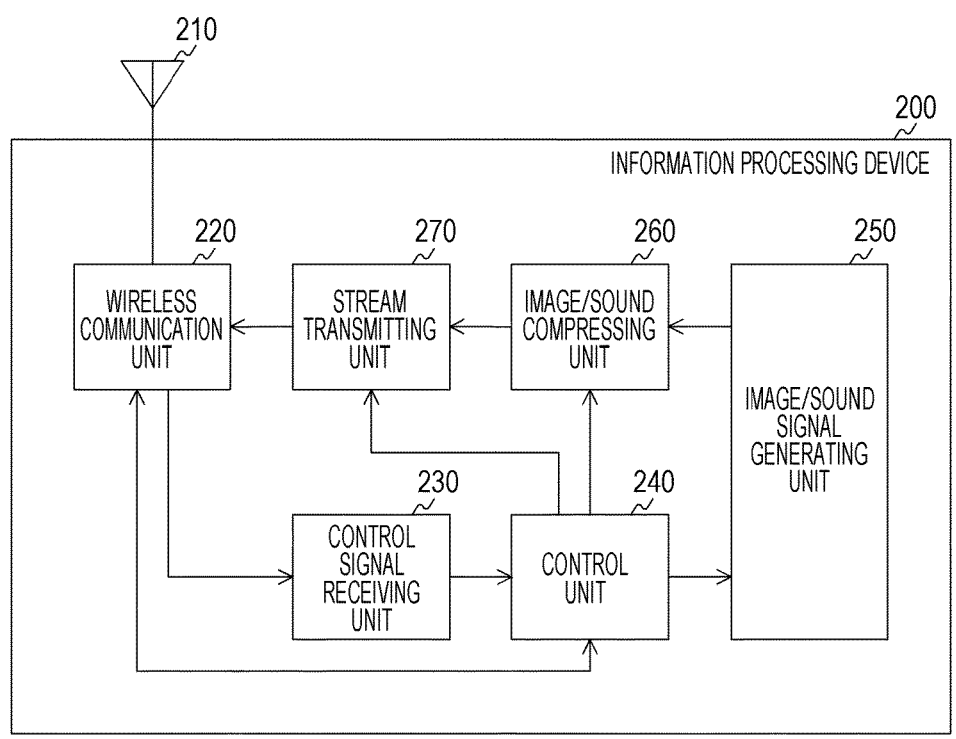
FIG. 2 is a block diagram showing an example functional structure of an information processing device 200 in the first embodiment of the present technology.

FIG. 2 is a block diagram showing an example functional structure of the information processing device 200 in the first embodiment of the present technology. The functional structure related to wireless communication of the information processing device 400 is substantially the same as the structure of the information processing device 200. Therefore, in the first embodiment of the present technology, only the information processing device 200 is explained, but the information processing device 400 is not explained.

The information processing device 200 includes an antenna 210, a wireless communication unit 220, a control signal receiving unit 230, a control unit 240, an image/sound signal generating unit 250, an image/sound compressing unit 260, and a stream transmitting unit 270.

Under the control of the control unit 240, the wireless communication unit 220 transfers various kinds of information (such as image data and audio data) to and from another information processing device (the information processing device 300, for example) via the antenna 210, using wireless communication. When an image data transmission process is performed, for example, image data generated by the image/sound signal generating unit 250 is compressed by the image/sound compressing unit 260, and the compressed image data (image stream) is transmitted from the antenna 210 via the wireless communication unit 220.

Also, the wireless communication unit 220 can transfer various kinds of information to and from another information processing device (the information processing device 300, for example), using more than one frequency channel. The first embodiment of the present technology shows an example where the wireless communication unit 220 has a function that can perform transmission and reception through three kinds of frequency channels of 2.4 GHz, 5 GHz, and 60 GHz. In a case where the source devices have a function that can perform transmission and reception through more than one frequency channel as described above, the sink device (the information processing device 300, for example) can perform control on which frequency channels are to be used by the respective source devices.

The control signal receiving unit 230 obtains a control information (information about exchange with the information processing device 300, for example) transmitted from another information processing device (the information processing device 300, for example) among respective pieces of information received by the wireless communication unit 220, and outputs the obtained control signal to the control unit 240.

The control unit 240 performs control on the respective pieces of information to be transmitted from the information processing device 200. For example, the control unit 240 controls the image/sound signal generating unit 250 and the image/sound compressing unit 260 based on the control signal received by the control signal receiving unit 230. For example, the control unit 240 performs control for changing the resolution of the image data to be transmitted or changing the number of audio channels, and performs control for changing the image region of the image data to be transmitted. That is, the control unit 240 performs data transmission rate control on the stream to be transmitted based on the control signal received by the control signal receiving unit 230.

The control unit 240 may also have the function to measure the radio wave propagation state (link radio wave propagation state) at the time of data transmission/reception with the sink device through wireless communication, and transmit the result of the measurement (radio wave propagation measurement information) to the sink device.

Here, the radio wave propagation measurement information is the information to be used when a check is made to determine whether the quality of the line to the sink device is high enough to perform transmission/reception of image data and audio data, for example. The radio wave propagation measurement information is also used when data transmission rate control is performed on the stream, for example. The radio wave propagation measurement information will be described later in detail, with reference to FIG. 4.

Here, the data transmission rate primarily means the communication channel occupancy, and also implies a communication speed and a communication capacity. The resolution is defined as the image quality index formed with a factor such as the frame of image data (the numbers of pixels in a row and a column), or the bit rate (compression rate) of image data. A stream throughput may be used as the image quality index. The number of audio channels implies a sound recording/reproducing method such as a monaural method (1.0 ch) or a stereophonic method (2.0 ch). The number of audio channels is also defined as the audio quality index formed with a factor such as the bit rate (compression rate) of audio data or the number of channels of audio data. A stream throughput may also be used as the audio quality index.

The control unit 240 also performs control for improving a state that cannot be stabilized through data rate control. For example, the control unit 240 obtains the system performance information about the sink device by exchanging information with the sink device (the information processing device 300, for example). Here, the system performance information is the performance information about the system of the sink device, for example. The system performance information is the available frequency channels, resolution, Transmission Control Protocol (TCP), and User Datagram Protocol (UDP), for example. The system performance information is also the information indicating compatibility with encoding techniques, compatibility with SD/HD, and compatibility with low power consumption mode, for example. For example, the control unit 240 can select a data transmission rate control method for further increasing the stability of the entire communication system 100 depending on whether the sink device is compatible with low power consumption mode.

The control unit 240 incorporates information indicating whether the information processing device 200 is a mobile device into the information exchange with the information processing device 300, for example. Information indicating whether the information processing device 200 is a mobile device can be incorporated into capability information about the information processing device 200, for example. Recognizing that the information processing device 200 is a mobile device, the information processing device 300 can determine that there is no need to cause the information processing device 200 to function based on the relationship with the other connected information processing device(s). In a case where it is determined that there is no need to cause the information processing device 200 to function, the information processing device 200 receives a transmission stop command from the information processing device 300. Recognizing the transmission stop command, the control unit 240 can cut off the power supplies to the respective functions of the image/sound signal generating unit 250, the image/sound compressing unit 260, and the stream transmitting unit 270 for a certain period of time. The control unit 240 can also cause the wireless communication unit 220 to switch to intermittent reception (the mode in which the wireless communication unit 220 is regularly activated so as to receive commands from the information processing device 300, but is cut off from the power source during the other times).

Under the control of the control unit 240, the image/sound signal generating unit 250 generates data to be output (image data and audio data), and outputs the generated data to the image/sound compressing unit 260. The image/sound signal generating unit 250 includes an imaging unit (not shown) and a sound acquiring unit (not shown), for example. The imaging unit (a lens, an imaging device, or a signal processing circuit, for example) images an object, and generates an image (image data). The sound acquiring unit (a microphone, for example) acquires the ambient sound at the time of generation of the image data. The data generated in this manner is to be transmitted to another information processing device (the information processing device 300, for example).

Under the control of the control unit 240, the image/sound compressing unit 260 compresses (encodes) the data (image data and audio data) generated by the image/sound signal generating unit 250. The image/sound compressing unit 260 then outputs the compressed data (image data and audio data) to the stream transmitting unit 270. The image/sound compressing unit 260 may be realized by software performing encoding, or may be realized by hardware performing encoding.

Under the control of the control unit 240, the stream transmitting unit 270 performs a transmission process to transmit the data (image data and audio data) compressed by the image/sound compressing unit 260 as a stream from the antenna 210 via the wireless communication unit 220.

The information processing device 200 can include components other than the above described components, such as a display unit, a sound output unit, and an operation accepting unit, but such components are not shown in FIG. 2. In the above described example, the information processing device 200 generates image data and audio data to be transmitted. However, the information processing device 200 may acquire image data and audio data to be transmitted, from an external device. For example, the information processing device 200 acquires image data and audio data to be transmitted, from a web camera equipped with a microphone. The information processing device 200 may transmit the content (such as content formed with image data and audio data) stored in a storage device (such as a hard disk).

The display unit (not shown) of the information processing device 200 is a display unit that displays an image generated by the image/sound signal generating unit 250, for example. The display unit may be a display panel such as an organic Electro Luminescence (EL) or an Liquid Crystal Display (LCD).

The sound output unit (not shown) of the information processing device 200 is a sound output unit (a speaker, for example) that outputs sound generated by the image/sound signal generating unit 250. Images can be output from a transmission device and a reception device, but sound is preferably output from only one of the two devices.

The operation accepting unit (not shown) of the information processing device 200 is an operation accepting unit that accepts an operation input performed by a user, and may be a keyboard, a mouse, a game pad, a touch panel, a camera, or a microphone, for example. It is possible to integrally form the operation accepting unit and the display unit by using a touch panel through which a user can perform an operation input by touching the display surface with a finger or bringing a finger close to the display surface.

[Example Structure of an Information Processing Device (Receiving Side)]

Figure 3:
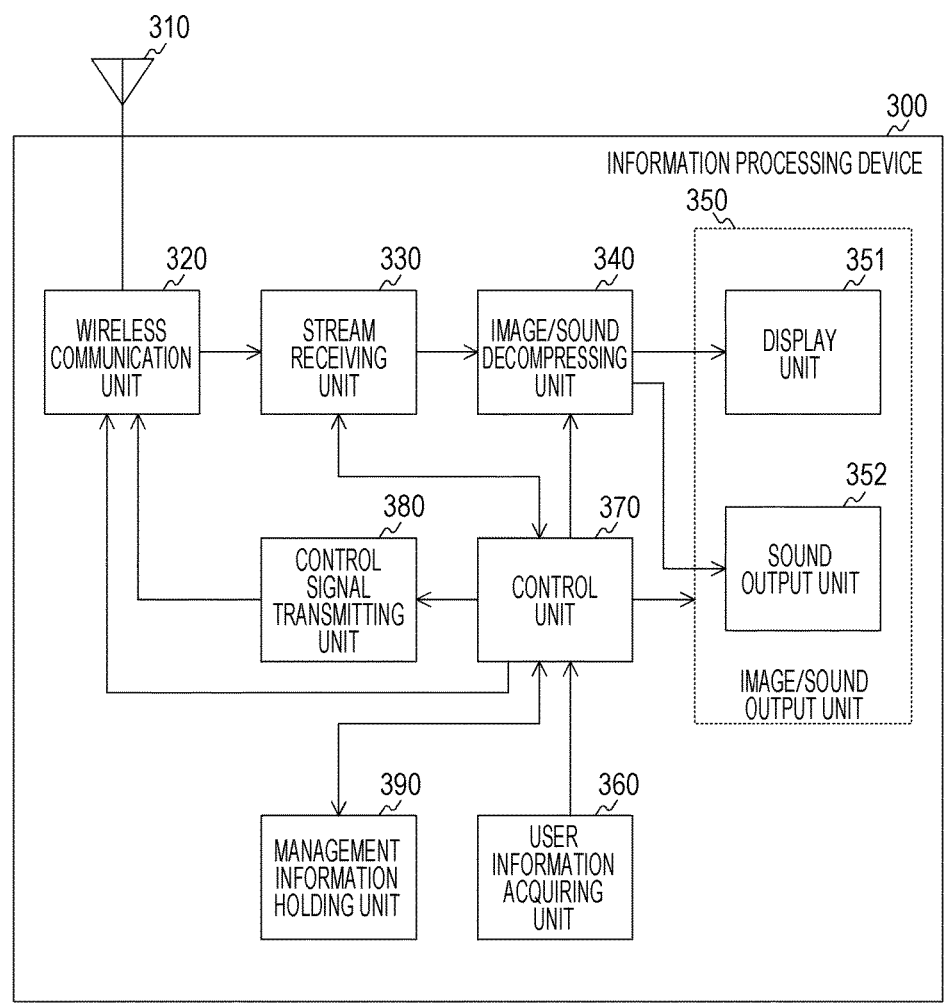
FIG. 3 is a block diagram showing an example functional structure of an information processing device 300 in this embodiment of the present technology.

FIG. 3 is a block diagram showing an example functional structure of the information processing device 300 in this embodiment of the present technology.

The information processing device 300 includes an antenna 310, a wireless communication unit 320, a stream receiving unit 330, an image/sound decompressing unit 340, an image/sound output unit 350, a user information acquiring unit 360, a control unit 370, a control signal transmitting unit 380, and a management information holding unit 390.

Under the control of the control unit 370, the wireless communication unit 320 transfers various kinds of information (such as image data and audio data) to and from another information processing device (the information processing device 200, for example) via the antenna 310, using wireless communication. In a case where an image data reception process is performed, for example, image data received by the antenna 310 is decompressed (decoded) by the image/sound decompressing unit 340 via the wireless communication unit 320 and the stream receiving unit 330. The decompressed image data is then supplied to the image/sound output unit 350, and the image corresponding to the decompressed image data is output from the image/sound output unit 350. That is, the image corresponding to the decompressed image data is displayed on the display unit 351.

Also, the wireless communication unit 320 can transfer various kinds of information to and from another information processing device (the information processing device 200, for example), using more than one frequency channel. The first embodiment of the present technology shows an example where the wireless communication unit 320 has a function that can perform transmission and reception through three kinds of frequency channels of 2.4 GHz, 5 GHz, and 60 GHz. That is, the wireless communication unit 320 can perform communication using a first frequency band, and communication using a second frequency band of a higher data transmission rate than the first frequency band. The control unit 370 also performs control on which frequency channel among the frequency channels is to be used in wireless communication with each source device.

The link between the information processing device 200 and the information processing device 300, and the link between the information processing device 400 and the information processing device 300 may be the same frequency channel, or may be different frequency channels.

The first embodiment of the present technology shows an example where the wireless communication unit 320 has a function that can perform transmission and reception through the three kinds of frequency channels of 2.4 GHz, 5 GHz, and 60 GHz, but the present technology is not limited to this example. For example, the wireless communication unit 320 may have some other frequency channel, or may have a function that can perform transmission and reception through two frequency channels or through four or more frequency channels.

Under the control of the control unit 370, the stream receiving unit 330 receives information about the exchange with each source device and a stream (an image stream and a sound stream, for example) among the respective pieces of information received by the wireless communication unit 320. The stream receiving unit 330 then outputs the received command information to the control unit 370, and outputs the received stream to the image/sound decompressing unit 340 and the control unit 370.

The information about the exchange with each source device is information transmitted from the source device (the information processing device 200, for example), and includes a request for acquisition of the system performance information about the information processing device 300, for example. The system performance information is information indicating the available frequency channels, resolution, TCP, UDP, compatibility with encoding techniques, compatibility with SD/HD, and compatibility with low power consumption mode, for example.

The stream receiving unit 330 may also have the function to measure the radio wave propagation state (link radio wave propagation state) at the time of data transmission/reception with the sink device through wireless communication. The stream receiving unit 330 then transmits the result of the measurement (radio wave propagation measurement information) to the control unit 370. The radio wave propagation measurement information will be described later in detail, with reference to FIG. 4.

Under the control of the control unit 370, the image/sound decompressing unit 340 decompresses (decodes) the stream (image data and audio data) transmitted from another information processing device (the information processing device 200, for example). The image/sound decompressing unit 340 then outputs the decompressed data (image data and audio data) to the image/sound output unit 350. The image/sound decompressing unit 340 may be realized by software performing decoding, or may be realized by hardware performing decoding.

The image/sound output unit 350 includes the display unit 351 and a sound output unit 352.

The display unit 351 is a display unit that displays respective images (the images 11 and 12 shown in FIG. 1, for example) based on the image data decompressed by the image/sound decompressing unit 340. The display unit 351 may be a display panel such as an organic EL panel or an LCD panel. The display unit 351 may also be a touch panel through which a user can perform an operation input by touching the display surface with a finger or bringing a finger close to the display surface.

The sound output unit 352 is a sound output unit (a speaker, for example) that outputs various kinds of sound based on the audio data decompressed by the image/sound decompressing unit 340 (the sound relates to the image displayed on the display unit 351, for example). Here, the sound output method may be a method by which only the sound of the source device assigned to the main image is reproduced through the speaker, but the sound of the source device assigned to the sub image is not reproduced, for example. Another example of the sound output method may be a method of by which the volume of the sound of the source device assigned to the main image is mainly increased, but the volume of the sound of the source device assigned to the sub image is lowered at the time of reproduction. It is also possible to use a sound output method other than the above methods.

The user information acquiring unit 360 acquires information about the user (the information is called user information), and outputs the acquired user information to the control unit 370. For example, the user information acquiring unit 360 can acquire the user information by accepting an input from an operation accepting unit (such as a keyboard, a mouse, a remote controller, a game pad, or a touch panel) through which the user can directly set a display method. The operation accepting unit is an operating unit for designating a desired region in the image displayed on the display unit 351, for example. For example, the user information acquiring unit 360 can acquire the user information by accepting an input from a device that can recognize the intension of the user, such as a camera, a microphone, or a sensor of a kind (such as a gyro sensor or a sensor that senses a human body).

For example, the user information acquiring unit 360 acquires the user information generated through a user operation when information based on a stream received from another information processing device (the information processing device 200, for example) through wireless communication is output from the image/sound output unit 350. This user information is the user information generated through a user operation related to the image displayed on the display unit 351, for example. The user information is information that is generated based on a user operation related to the image displayed on the display unit 351, for example.

The control unit 370 causes the management information holding unit 390 to hold the respective pieces of information acquired by the stream receiving unit 330, and manages the respective source devices based on the management information held in the management information holding unit 390. The control unit 370 also performs data transmission rate control on streams transmitted from the source devices so that the stability of the entire system will increase.

For example, the control unit 370 performs the data transmission rate control based on the user information acquired by the user information acquiring unit 360 and the management information held in the management information holding unit 390. Specifically, the control unit 370 generates a control signal for performing the stream data transmission rate control for each source device based on the management information held in the management information holding unit 390, and outputs the generated control signal to the control signal transmitting unit 380. For example, the control unit 370 changes the resolution of the image to be displayed on the display unit 351 based on the user information and the management information, and generates a control signal for requesting a transmission rate equivalent to this resolution from each source device. The control unit 370 also generates a control signal for changing the display region of the image in the display unit 351 based on the user information and the management information, for example. The control unit 370 also generates a control signal for changing the size of the image in the display unit 351 based on the user information and the management information, for example.

The control unit 370 also performs control for setting the frequency channel to be used and the resolution based on the user information and the management information. For example, the control unit 370 sets the frequency channel to be used for each source device among the frequency channels of the wireless communication unit 320. In a case where the frequency channels have different power consumption modes from one another, the control unit 370 can recognize the respective modes, and set a frequency channel by taking into consideration the power consumption of the mobile device. That is, the control unit 370 can set a first power consumption mode related to the first frequency band, and independently of that, set a second power consumption mode related to the second frequency band of a higher data transmission rate than the first frequency band.

The control signal transmitting unit 380 performs a transmission process to transmit a control signal output from the control unit 370 to another wireless communication device via the wireless communication unit 320 and the antenna 310.

The management information holding unit 390 is a table that holds information (the management information) for managing the respective source devices connected to the information processing device 300, using wireless communication. The contents of the information held in the management information holding unit 390 will be described below in detail, with reference to FIG. 4.

[Example of the Contents of the Information Held in the Management Information Holding Unit]

FIG. 4 is a diagram schematically showing an example of the contents of the information held in the management information holding unit 390 in the first embodiment of the present technology.

The management information holding unit 390 is a table that holds information (the management information) for managing the respective source devices connected to the information processing device 300, using wireless communication. For example, the management information holding unit 390 holds terminal identification information 391, frequency channels 392, radio wave propagation measurement information 393, device information 394, band usage levels 395, output formats 396, standby/wakeup 397, which are associated with one another.

In the terminal identification information 391, identification information for identifying the source devices connected to the information processing device 300 through wireless communication is stored.

In the frequency channels 392, the frequency channels that are actually being used by the source devices connected to the information processing device 300 through wireless communication is stored.

In the radio wave propagation measurement information 393, the radio wave propagation measurement information related to the source devices connected to the information processing device 300 through wireless communication is stored. This radio wave propagation measurement information is measured by the stream receiving unit 330 for each source device connected to the information processing device 300 through wireless communication.

As the radio wave propagation measurement information 393, Patent Error Rates (PERs), Bit Error Rates (BERs), the numbers of packet retransmissions, and throughputs are stored, for example. Also, as the radio wave propagation measurement information 393, drop frames, Signal to Interference Ratios (SIRs), and Received Signal Strength Indicators (RSSIs) are stored, for example. Here, it is possible to use Signal to Interference plus Noise Ratios (SINRs), instead of SIRs. The radio wave propagation measurement information 393 shown in FIG. 4 is an example, and at least one of those factors may be stored, or some other radio wave propagation measurement information measured by the stream receiving unit 330 may be stored. Alternatively, radio wave propagation measurement information measured by the source devices may be acquired and stored. Further, the receiving side may detect a delay of a packet to be received, and use the information related to this packet delay as the radio wave propagation measurement information. This packet delay serves as an index related to radio wave propagation, since a delay is caused in transmission to the receiving side through a retransmission process in layer 2 when an error occurs, for example. Further, a packet delay serves as an index indicating that some link characteristics are degraded in a wireless system in which a radio band is shared among devices, for example.

In the device information 394, the types of the source devices (the attributes of the source devices) connected to the information processing device 300 through wireless communication are stored. For example, as the type of a source device, a mobile device or a stationary device is stored. As the type of a source device, a device to be used while being connected to a power supply, or some other device may be stored. Alternatively, as the type of a source device, a battery-driven device or some other device may be stored.

In the band usage levels 395, the band usage levels of the source devices connected to the information processing device 300 through wireless communication are stored. As a band usage level, a resolution or a throughput may be used, for example. Alternatively, the throughputs being used may be stored as the band usage levels. Also, a predetermined table may be prepared, and numbers indicating respective regions in the table may be stored for management purposes.

In the output formats 396, the output formats of data based on streams transmitted from the source devices connected to the information processing device 300 through wireless communication are stored. For example, the display formats (main image and sub image) of image data in the display unit 351 based on streams transmitted from the source devices are stored. Also, the output formats (main sound and sub sound) of audio data from the sound output unit 352 based on streams transmitted from the source devices are stored, for example. The sub image may not be displayed depending on display formats.

In the standby/wakeup 397, the modes (standby mode and wakeup mode) of the source devices connected to the information processing device 300 through wireless communication are stored. The standby mode and the wakeup mode will be described later in detail, with reference to FIGS. 6 through 8.

As described above, the management information held in the management information holding unit 390 is the management information connecting the identification information (the terminal identification information 391) for identifying the other information processing devices to the capability information about the other information processing devices. Also, the management information held in the management information holding unit 390 includes, as the capability information about the other information processing devices, at least the information (the radio wave propagation measurement information 393) about the radio wave propagation measurement related to communication with the other information processing devices, and the information (the standby/wakeup 397) about power consumption. Also, the management information held in the management information holding unit 390 includes, as the capability information about the other information processing devices, at least the information (the output formats 396) about the output formats for displaying image information. The information about the output formats is the information indicating whether image information is of main display or of sub display, for example.

[Example of Transition of Images]

FIG. 5 is a diagram showing an example of transition of images displayed on the display unit 351 of the information processing device 300 in the first embodiment of the present technology.

In FIG. 5, a shows an example of the display formats of the image 11 and the image 12 displayed on the display unit 351 of the information processing device 300 in such a manner that the image 11 is displayed as the main image while the image 12 is displayed as the sub image.

In FIG. 5, b shows an example of the display formats of the image 11 and the image 12 displayed on the display unit 351 of the information processing device 300 in such a manner that the image 11 is displayed as the sub image while the image 12 is displayed as the main image.

For example, it is assumed that the information processing device 200 and the information processing device 400 each transmit a stream (image data and audio data) with a standard resolution to the information processing device 300. In this case, the image 11 based on the image data transmitted from the information processing device 200 and the image 12 based on the image data transmitted from the information processing device 400 can be displayed on the display unit 351 of the information processing device 300 in such a manner that the image 11 and the image 12 have the same size, as shown in FIG. 1. Although the resolution and the display region are fixed in this example, a scaler function may be added to the display unit 351 so that the image 11 and the image 12 are rescaled and are then displayed on the display unit 351. However, the embodiment of the present technology is based on the assumption that this function is not used, for ease of explanation.

As for the respective display formats of the image 11 and the image 12, the display formats that have been set during the previous communication may be kept, and the image 11 and the image 12 in those display formats may be displayed on the display unit 351 of the information processing device 300.

Alternatively, the display formats of the image 11 and the image 12 may be determined based on the order of connections to the information processing device 300. For example, it is assumed that the information processing device 200 is first connected to the information processing device 300, and, after this connection, the information processing device 400 is connected to the information processing device 300. In this case, the image 11 and the image 12 are displayed on the display unit 351 of the information processing device 300 in such a manner that the image 11 is displayed as the main image while the image 12 is displayed as the sub image. That is, the main image and the sub image may be displayed in this order based on the order of connections to the information processing device 300.

It is assumed that user information indicating that the image 12 is the main image is acquired by the user information acquiring unit 360 in a case where the image 11 and the image 12 are displayed on the display unit 351 in such a manner that the image 11 is displayed as the main image while the image 12 is displayed as the sub image, as shown in a in FIG. 5. For example, a viewer performs an operation for setting the image 12 as the main image by using a remote controller or a pointer such as a gesture, and the user information indicating that the image 12 is the main image is then acquired by the user information acquiring unit 360. In this case, the image 11 and the image 12 are displayed on the display unit 351 in such a manner that the image 12 is displayed as the main image while the image 11 is displayed as the sub image, as shown in b in FIG. 5. The display positions of the image 11 and the image 12 on the display surface of the display unit 351 are also determined based on the user information (a manual operation or a line of sight, for example) acquired by the user information acquiring unit 360.

[Example of Communication]

Figure 6:
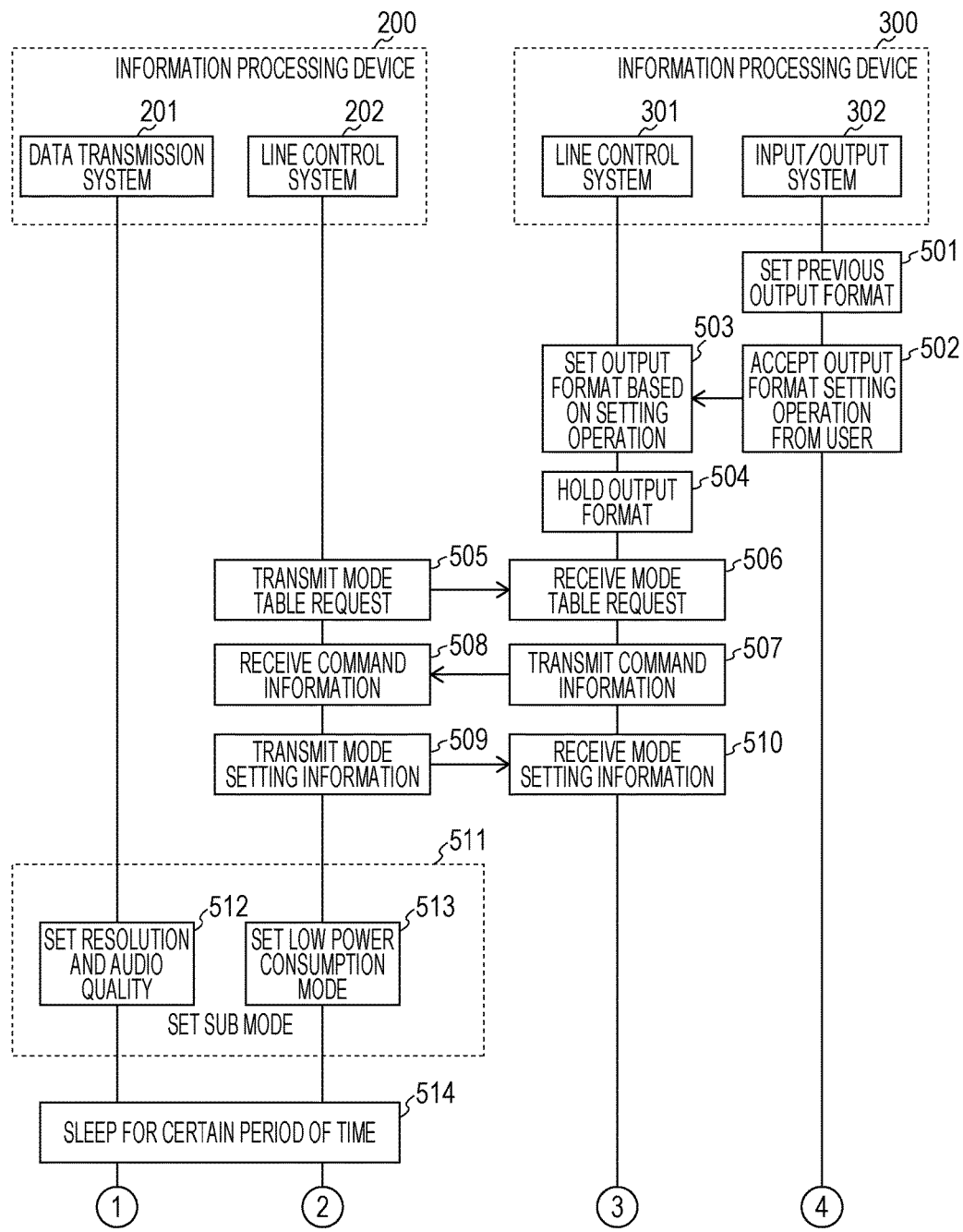
FIG. 6 is a sequence chart of an example of a communication process to be performed between devices in the communication system 100 in the first embodiment of the present technology.
Figure 7:
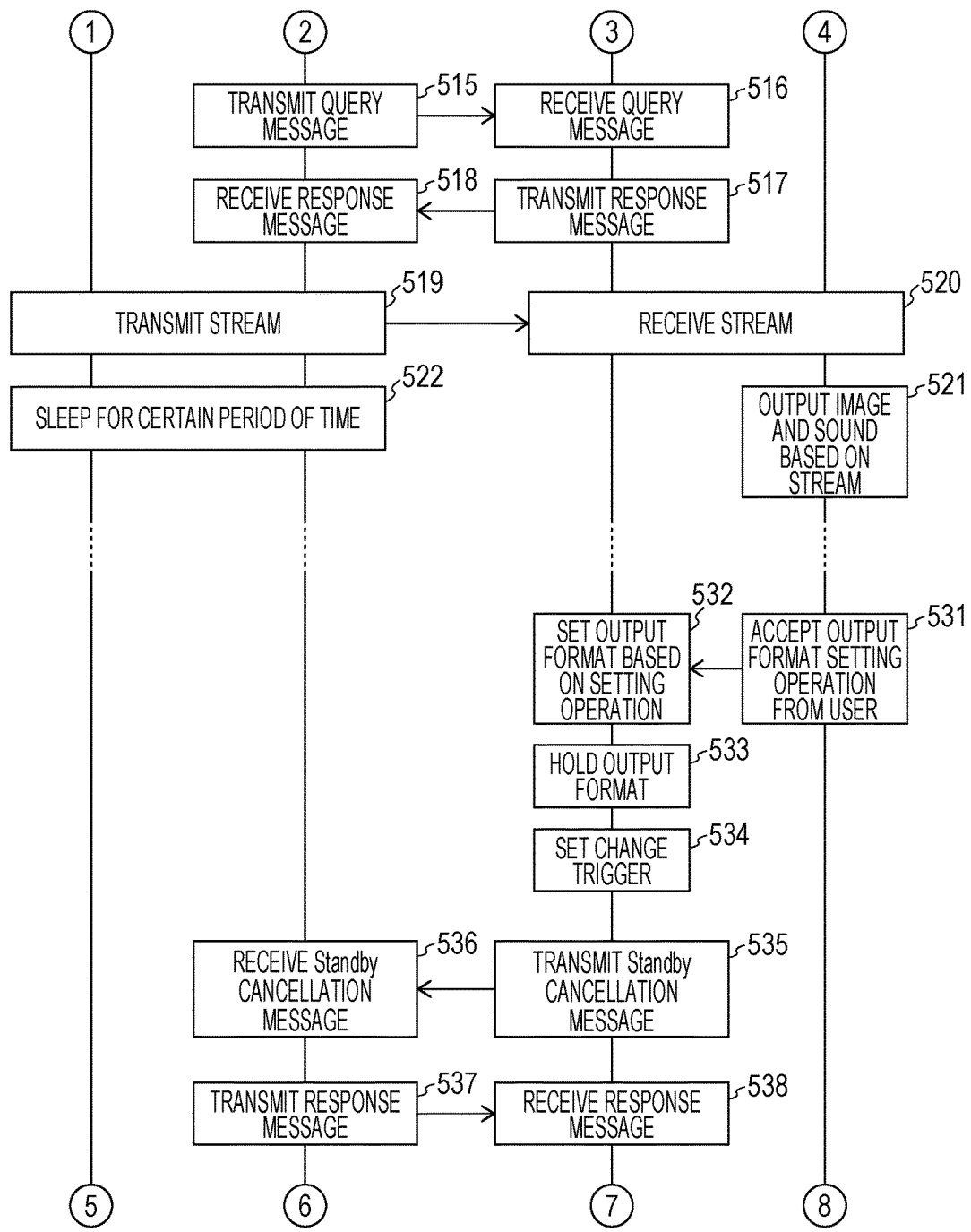
FIG. 7 is a sequence chart of an example of a communication process to be performed between devices in the communication system 100 in the first embodiment of the present technology.
Figure 8:
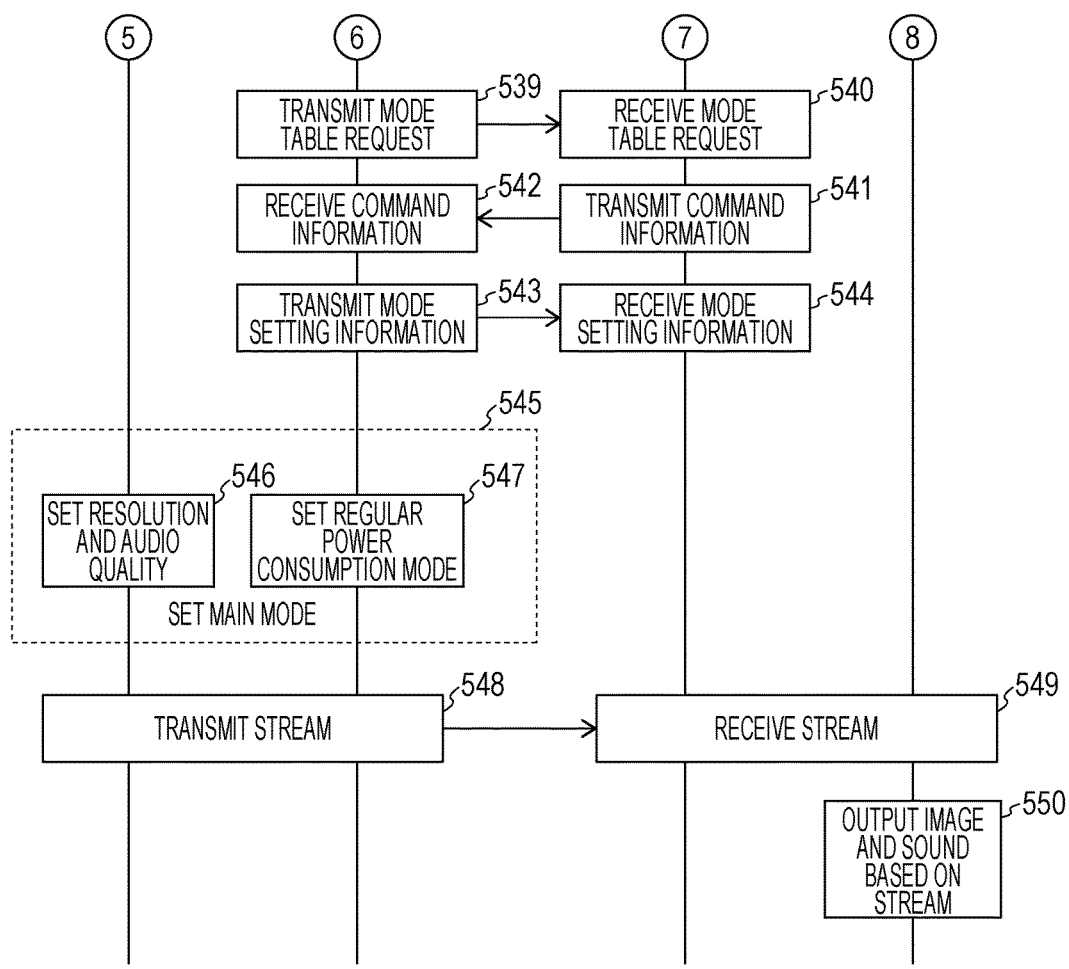
FIG. 8 is a sequence chart of an example of a communication process to be performed between devices in the communication system 100 in the first embodiment of the present technology.

FIGS. 6 through 8 show a sequence chart of an example of a communication process to be performed between devices in the communication system 100 in the first embodiment of the present technology. FIGS. 6 through 8 show an example of a communication process to be performed between the information processing device 200 and the information processing device 300.

Of the components constituting the information processing device 200, the image/sound signal generating unit 250, the image/sound compressing unit 260, and the stream transmitting unit 270 are shown as a data transmission system 201 in FIGS. 6 through 8. Meanwhile, the antenna 210, the wireless communication unit 220, the control signal receiving unit 230, and the control unit 240 are shown as a line control system 202.

Of the components constituting the information processing device 300, the antenna 310, the wireless communication unit 320, the stream receiving unit 330, the control unit 370, and the control signal transmitting unit 380 are shown as a line control system 301 in FIGS. 6 through 8. Meanwhile, the image/sound decompressing unit 340, the image/sound output unit 350, and the user information acquiring unit 360 are shown as an input/output system 302.

Also, FIGS. 6 through 8 show an example where an image based on image data transmitted from the information processing device 200 is first displayed as the sub image on the display unit 351 of the information processing device 300, and a low power consumption mode is set in the information processing device 200. In the example, an image based on image data transmitted from the information processing device 200 is then displayed as the main image on the display unit 351, and a regular power consumption mode is set in the information processing device 200. That is, FIGS. 6 through 8 show an example of a connection setup between the information processing device 200 and the information processing device 300, and an example of transition of the power consumption mode in the information processing device 200.

First, when the information processing device 300 is powered on, the previous output format (the output format at the time when the information processing device 300 was powered off) is set as the output format (the image display format and the sound output format) of the information processing device 300 (501). The control unit 370 of the information processing device 300 causes the management information holding unit 390 (shown in FIG. 4) to hold the management information about the respective source devices connected to the information processing device 300 through wireless communication. Based on the previous output format, the control unit 370 of the information processing device 300 causes the display unit 351 to display the images 11 and 12 corresponding to two streams transmitted from the information processing device 200 and the information processing device 400, as shown in FIG. 5.

An operation to set an output format (a changing operation) is then supposedly performed by a user (502). In this case, a control signal related to the setting operation is acquired as user information by the user information acquiring unit 360, and the user information is output to the control unit 370. The control unit 370 then changes the contents of the information held in the management information holding unit 390 (shown in FIG. 4) based on the user information (503, 504). For example, a setting operation (changing operation) is supposedly performed to change the image 11 based on the image data transmitted from the information processing device 200 to the sub image, as shown in b in FIG. 5. In this case, the control unit 370 changes the output format 396 (shown in FIG. 4) of the information processing device 200 in the management information holding unit 390 to "sub" (503, 504).

The information processing device 200 transmits a mode table request (a query request for resolution/audio quality, low power consumption mode, and the like) to the information processing device 300 on a regular basis or on an irregular basis (or only at the time of the start) (505, 506). This mode table request is for requesting transmission of the respective pieces of information being managed in the information processing device 300 (the respective pieces of information are the management information about the information processing device 300, and the information to be used in communication with the information processing device 200 (such as the information about the resolution that can be displayed on the information processing device 200)).

Receiving the mode table request (506), the information processing device 300 transmits command information in response to the mode table request (the command information includes resolution/audio quality, the types of image and audio codecs, the existence/non-existence of a 3D function, the existence/non-existence of content protection, the display size of the display device, topology information, the available protocols, the setting information (such as port information) about these protocols, connection interface information (such as the connector type), the positions of horizontal synchronization and vertical synchronization, the performance priority request information about the source device, a mode control table response such as the compatiblity/imcompatibility with the low power consumption mode, the maximum throughput that can be transmitted or received by radio, the power of the Central Processing Unit (CPU), the remaining battery level, and power supply information) (507, 508). The command information is the information about the information processing device 200 that is designed for the information processing device 300 to request settings from the information processing device 200 while taking into account the radio wave propagation environment and the display form. The command information is also information that includes the output format information about the resolution/audio quality, and the compatibility/ imcompatibility with the low power consumption mode. These pieces of information is also included in the capability information. Here, the output format information about the resolution/audio quality of the information processing device 200 is information indicating that the output format of data transmitted from the information processing device 200 is "main" or "sub". The information processing device 300 incorporates a request related to the settings of the resolution/audio quality and the low power consumption mode in the form of parameters into the command information from the viewpoint of the information processing device 300, and then transmits the command information. Other than the respective pieces of information about the information processing device 200, the information processing device 300 may also transmit the respective pieces of information about all the source devices as the command information. In this case, the information processing device 200 selects and uses only the information about the information processing device 200. A device compliant with Wi-Fi CERTIFIED Miracast is compatible with wfd-audiocodecs, wfd-video-formats, wfd-content-protection, wfddisplayedid, wfd-coupledsink, wfd-client-rtpports, wfd-I2C, wfd-uibccapability, wfd-connectortype, wfd-standby-resume-capability, and the like, which are defined as RTSP Message. In this command, however, the contents of the message to be transmitted is not particularly limited.

In a case where the command information is received (508), the control unit 240 of the information processing device 200 identifies the output format of the data transmitted from the information processing device 200 as "main" or "sub" based on the command information. The control unit 240 of the information processing device 200 also determines whether the information processing device 300 has a function compatible with a power consumption operation mode based on the command information. The control unit 240 of the information processing device 200 then transmits mode setting information indicating that the identified output format is to be set, to the information processing device 300 (509, 510). In this example, the output format of the data from the information processing device 200 has been identified as "sub". Also, the information processing device 300 has a function compatible with the low power consumption mode. Therefore, the control unit 240 of the information processing device 200 transmits mode setting information to the information processing device 300, to notify the information processing device 300 that the identified output format (sub) is to be set, and the low power consumption mode is to be set (509, 510).

In this example, the low power consumption mode is set after the image is identified as the main image or as the sub image based on the command information. However, the low power consumption mode may be set, regardless of whether the image is the main image or whether the image is the sub image. For example, a permission flag for permitting transition to the low power consumption mode is exchanged between the source device and the sink device, and the low power consumption mode may be set.

The control unit 240 of the information processing device 200 then sets a sub mode as the transmission mode (511). As a result, the resolution for displaying the sub image, and the audio quality for outputting sub sound are set in the data transmission system 201 (512). Meanwhile, the low power consumption mode is set in the line control system 202 (513).

In a case where the low power consumption mode is set as described above, both the sink device and the source device need to have the corresponding function. For example, a mobile device (such as a portable telephone, a smartphone, or a tablet terminal) is normally battery-driven. Therefore, if the output format of data transmitted from its own device (where the output format is "sub"), the battery power consumption of its own device is preferably minimized. In view of this, it is preferable to set the low power consumption mode in a source device having the output format in the sink device set as "sub". Further, in the setting process (512), a setting may be provided so that only the sound of the source device assigned to the main image is reproduced through the speaker, but the sound of the source device assigned to the sub image is not reproduced. Alternatively, a setting may be provided so that the volume of the sound of the source device assigned to the main image is mainly increased, but the volume of the sound of the source device assigned to the sub image is lowered at the time of reproduction.

As described above, the control unit 370 of the information processing device 300 performs control for setting the low power consumption mode in the information processing device 200 in a case where the output format is set as the sub image (sub display). That is, the control unit 370 of the information processing device 300 performs control for setting a power consumption mode in the information processing device 200 based on the output format of the display unit 351 that outputs image information based on a stream.

In a case where the low power consumption mode is set as described above (513), the control unit 240 of the information processing device 200 starts intermittent transmission (514 through 522).

Specifically, the information processing device 200 suspends the transmission process for a certain period of time, and puts the respective components to sleep (514). After the certain period of time has passed (514), the information processing device 200 wakes up the respective components of the information processing device 200 so as to perform a transmission process, and performs transmission to the information processing device 300 (515 through 520).

For example, the control unit 240 of the information processing device 200 transmits a query message to the information processing device 300, to check whether there is a change (such as a change of the output format) in the information processing device 300 (515, 516).

Receiving the query message (516), the control unit 370 of the information processing device 300 transmits a response message to the information processing device 200, to notify the information processing device 200 whether there is a change (such as a change of the output format) (517, 518). In this example, there are no changes (such as a change of the output format) in the information processing device 300. Therefore, the control unit 370 of the information processing device 300 transmits a response message to the information processing device 200, to notify the information processing device 200 that there are no changes (such as a change of the output format) (517, 518).

As described above, in a case where a response message to the effect that there are no changes (such as a change of the output format) is received (518), there is no need to change any setting in the information processing device 200. Therefore, the control unit 240 of the information processing device 200 transmits a stream for outputting the sub image and the sub sound, to the information processing device 300 (519, 520). Receiving the stream (520), the information processing device 300 outputs an image and a sound based on the received stream (521). For example, the image 11 based on the stream from the information processing device 200 is displayed as the sub image on the display unit 351, as shown in b in FIG. 5.

When the transmission process ends (519), the information processing device 200 suspends the transmission process for a certain period of time, and puts the respective components to sleep (522). Also, intermittent transmission is continued until a change request is issued from the information processing device 300.

In the intermittent transmission, there are periods during which any stream is not transmitted from the information processing device 200. Therefore, the information processing device 300 preferably performs a display process to interpolate and then display the image corresponding to the stream last received from the information processing device 200. However, the information processing device 300 may not have an interpolation process function. In such a case, any image from the information processing device 200 cannot be displayed on the display unit 351 during the sleep period. Therefore, in a case where the information processing device 300 does not have an interpolation process function, transmission of image data from the information processing device 200 may be continued. For example, among the streams to be transmitted from the information processing device 200, the last image data at the time of transmission suspension is stored into a transmission buffer. During the sleep period, the image processing in the information processing device 200 is suspended. However, the transmission process is continued for the radio link, and the transmission of the image data stored in the transmission buffer is continued.

Also, during the sleep period, only the image corresponding to a stream transmitted from the information processing device 400 may be displayed on the display unit 351. For example, the image corresponding to a stream transmitted from the information processing device 400 can be displayed on the entire surface of the display unit 351.

Next, an example case where an operation to set an output format (a changing operation) is performed by a user is described.

In a case where an operation to set an output format (a changing operation) is performed by a user (531), the control unit 370 changes the contents of the information held in the management information holding unit 390 (shown in FIG. 4) based on the user information related to the setting operation, as described above (532, 533). For example, a setting operation (changing operation) is supposedly performed to change the image 11 based on the image data transmitted from the information processing device 200 to the main image, as shown in a in FIG. 5. In this case, the control unit 370 changes the output format 396 (shown in FIG. 4) of the information processing device 200 in the management information holding unit 390 to "main" (532, 533).

In this example, in a case where the low power consumption mode has been set in the information processing device 200, the information processing device 200 has been supposedly put to sleep as described above. In a case where the information processing device 200 has been put to sleep as described above, it is not possible to notify the information processing device 200 that an operation to set an output format (a changing operation) has been performed by a user.

In a case where an operation to set an output format (a changing operation) is performed by a user (531), and the contents of the information held in the management information holding unit 390 (shown in FIG. 4) are changed (532, 533), the control unit 370 of the information processing device 300 sets a change trigger (534). This change trigger is the trigger for notifying the information processing device 200 that an operation to set an output format (a changing operation) has been performed by a user, when a query message is received from the information processing device 200. With this change trigger, the state where the information processing device 200 is in a standby mode is canceled, and the information processing device 200 is notified that an operation to set an output format (a changing operation) has been performed by a user.

In this example, the respective components of the information processing device 200 are then woken up, and transmission to the information processing device 300 is supposedly started. In this case, the control unit 370 of the information processing device 300 transmits a standby cancellation message to the information processing device 200 (535, 536).

Receiving the standby cancellation message (536), the control unit 240 of the information processing device 200 transmits a response message to the information processing device 300 (537, 538).

As described above, in accordance with the standby mode cancellation request from the sink device (535 through 538), the information processing device 200 needs to inquire for the setting status. Therefore, the control unit 240 of the information processing device 200 transmits a mode table request to the information processing device 300 (539, 540). As described above, this mode table request is for requesting transmission of the respective pieces of information being managed in the information processing device 300 (the respective pieces of information are the management information about the information processing device 200). In the above described procedures (535 through 538), exchange of a message (the response message in reply to the query message in the procedures (515 through 518), for example) to the effect that there is a change (such as a change of the output format) may be performed.

Receiving the mode table request (540), the information processing device 300 transmits the command information in accordance with the mode table request (541, 542). In a case where the command information has already been transmitted from the information processing device 300 to the information processing device 200, the information processing device 200 has already obtained the information included in the command information. Therefore, the information processing device 300 may transmit only difference information as the command information in accordance with the mode table request (541, 542). This difference information is the information related to the change, and is the resolution/audio quality output format information about the information processing device 200, for example.

In a case where the command information is received (542), the control unit 240 of the information processing device 200 identifies the output format of the data transmitted from the information processing device 200 as "main" or "sub" based on the command information. The control unit 240 of the information processing device 200 then transmits mode setting information indicating that the identified output format is to be set, to the information processing device 300 (543, 544). In this example, the output format of the data from the information processing device 200 has been identified as "main". Therefore, the control unit 240 of the information processing device 200 transmits mode setting information to the information processing device 300, to notify the information processing device 300 that the identified output format (main) is to be set, and the regular power consumption mode is to be set (543, 544). A device compliant with Wi-Fi CERTIFIED Miracast may carry out the procedures (539 through 544) through Capability Re-negotiation. In the case of Capability Re-negotiation, there is no need to renegotiate setting values that do not have any changes in the output format in the procedure (534). Such setting values are of wfd-displayedid, wfd-client-rtpports, wfd-I2C, and wfd-connectortype, for example.

The control unit 240 of the information processing device 200 then sets a main mode as the transmission mode (545). Accordingly, the resolution for displaying the main image and the audio quality for outputting the main sound are set in the data transmission system 201 (546). Meanwhile, the regular power consumption mode is set in the line control system 202 (547).

In a case where the regular power consumption mode is set as described above (547), the control unit 240 of the information processing device 200 starts a regular transmission process (548, 549). That is, the information processing device 200 transmits a stream for outputting the main image and the main sound, to the information processing device 300 (548, 549). Receiving the stream (549), the information processing device 300 outputs an image and a sound based on the received stream (550). For example, the image 11 based on the stream from the information processing device 200 is displayed as the main image on the display unit 351, as shown in a in FIG. 5.

In this example, when the information processing device 300 is powered on, the previous output format (the output format at the time when the information processing device 300 was powered off) is set as the display format of the display unit 351 as described above. However, some other output format may be set when the information processing device 300 is powered on. For example, a default output format may be invariably set whenever the information processing device 300 is powered on. Alternatively, a display format may be determined based on the order of connections to the information processing device 300.

FIGS. 6 through 8 show an example case where the information processing device 200 inquires for the setting information about the information processing device 300, and sets transmission parameters based on the received parameter information. However, the information processing device 200 may request the information processing device 300 for desired parameters, and the desired parameters may be set when a response to the effect that there is no problem with the parameters is received from the information processing device 300. Such an example is shown in FIGS. 9 and 10.

[Example of Communication]

Figure 9:
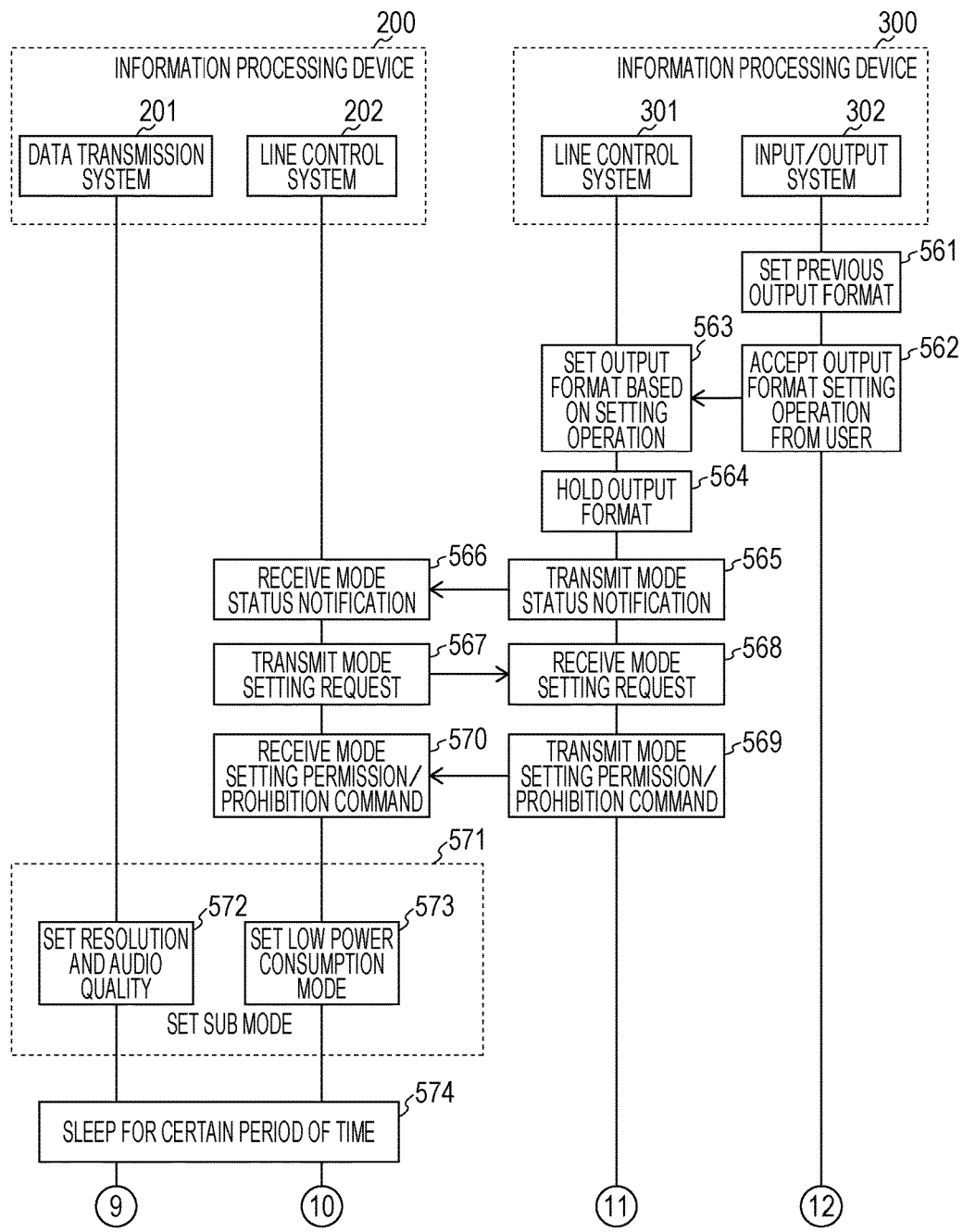
FIG. 9 is a sequence chart of an example of a communication process to be performed between devices in the communication system 100 in the first embodiment of the present technology.
Figure 10:
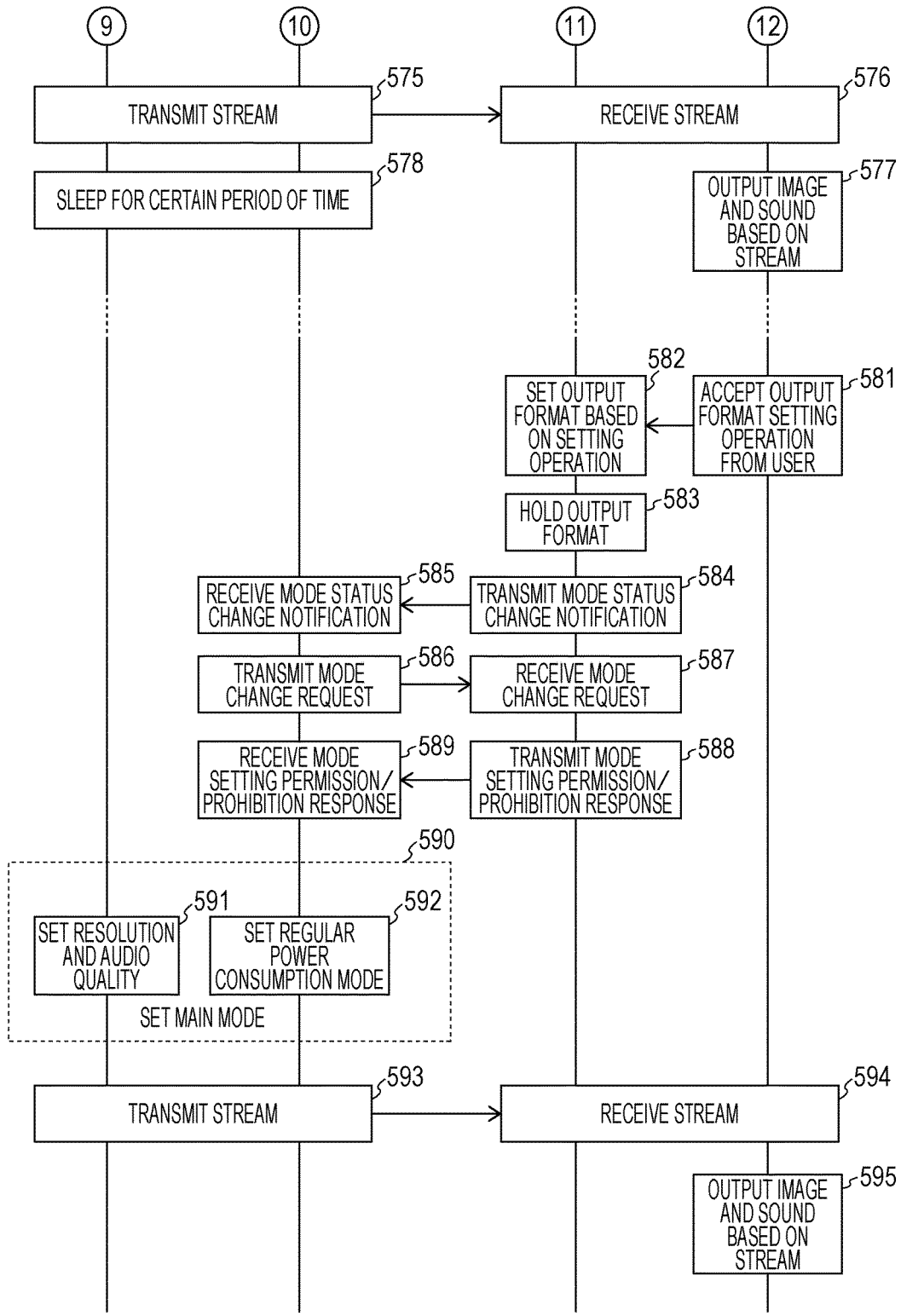
FIG. 10 is a sequence chart of an example of a communication process to be performed between devices in the communication system 100 in the first embodiment of the present technology.
Figure 11:
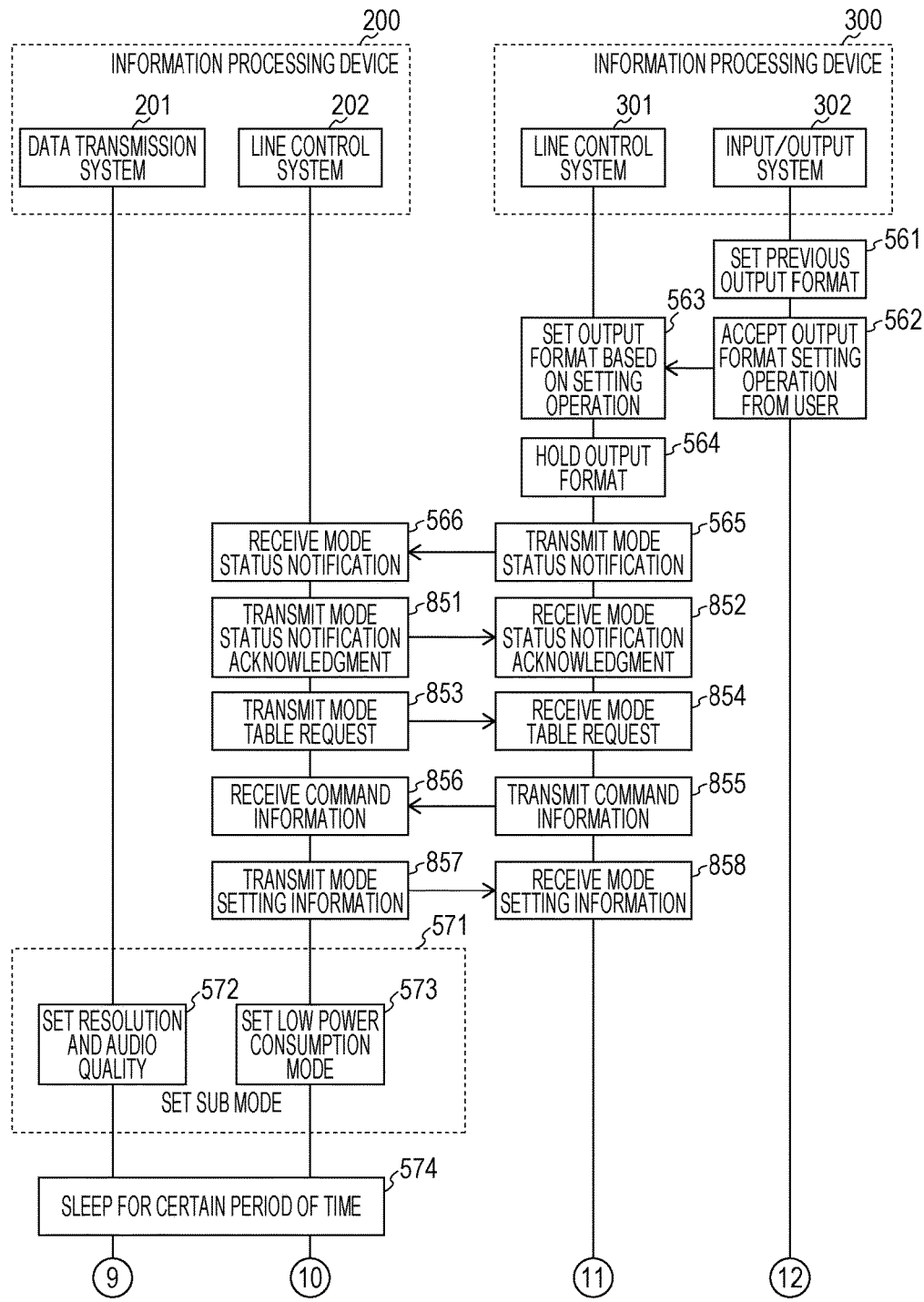
FIG. 11 is a sequence chart of an example of a communication process to be performed between devices in the communication system 100 in the first embodiment of the present technology.

FIGS. 9 through 11 show a sequence chart of an example of a communication process to be performed between devices in the communication system 100 in the first embodiment of the present technology. FIGS. 9 and 10 show a chart formed by partially modifying the example communication process shown in FIGS. 6 through 8. Therefore, in FIGS. 9 and 10, the same components as those in the example communication process shown in FIGS. 6 through 8 are denoted by the same reference numerals as those used in FIGS. 6 through 8, and explanation of them will be partially skipped in the description below. FIG. 11 shows a chart formed by partially modifying the example communication process shown in FIG. 9. Therefore, in FIG. 11, the same components as those in the example communication process shown in FIG. 9 are denoted by the same reference numerals as those used in FIG. 9, and explanation of them will be partially skipped in the description below.

The procedures (561 through 564) shown in FIG. 9 are equivalent to the procedures (501 through 504) shown in FIG. 6.

The control unit 370 of the information processing device 300 then transmits a mode status notification to the information processing device 200, to notify the information processing device 200 of the output format set by a user (565, 566). This mode status notification is information for notifying the information processing device 200 of not only the output format ("main" or "sub", for example) set by a user, but also the resolution/audio quality that can be set by the information processing device 200, the types of image and audio codecs, the existence/non-existence of a 3D function, the existence/non-existence of content protection, the display size of the display device, topology information, the available protocols, the setting information (such as port information) about these protocols, connection interface information (such as the connector type), the positions of horizontal synchronization and vertical synchronization, the performance priority request information about the source device, a mode control table response such as the compatiblity/incompatibility with the low power consumption mode, the maximum throughput that can be transmitted or received by radio, the CPU power, the remaining battery level, power supply information, and the like.

As described above, immediately after an output format setting operation is performed on the information processing device 300 by a user, the mode status notification for notifying the information processing device 200 of the output format according to the setting operation can be transmitted to the information processing device 200. Accordingly, the setting time (changing time) required between the information processing device 200 and the information processing device 300, which are connected to each other through wireless communication, can be shortened.

Receiving the mode status notification (566), the control unit 240 of the information processing device 200 compares the status parameter specified by the received mode status notification with the status parameter of its own. The control unit 240 of the information processing device 200 then determines the contents of the setting (such as resolution/audio quality and a power consumption mode) based on the result of the comparison. The control unit 240 of the information processing device 200 then transmits a mode setting request to the information processing device 300, to notify the information processing device 300 of the determined contents of the setting (such as resolution/audio quality and a power consumption mode) (567, 568).

Receiving the mode setting request (568), the control unit 370 of the information processing device 300 determines whether to permit the contents of the setting (such as resolution/audio quality and a power consumption mode) specified by the received mode setting request. The control unit 370 of the information processing device 300 then transmits a mode setting permission/prohibition command to the information processing device 200, to notify the information processing device 200 of the result of the determination (569, 570).

Receiving the mode setting permission/prohibition command (570), the control unit 240 of the information processing device 200 checks the contents of the mode setting permission/prohibition command. In a case where the received mode setting permission/prohibition command permits the contents of the setting according to the mode setting request transmitted from the information processing device 200, the control unit 240 of the information processing device 200 sets the sub mode as the transmission mode (571). The procedures (571 through 574) shown in FIG. 9 are equivalent to the procedures (511 through 514) shown in FIG. 6. Also, the procedures (575 through 578) shown in FIG. 10 are equivalent to the procedures (519 through 522) shown in FIG. 7.

In a case where the received mode setting permission/prohibition command does not permit the contents of the setting according to the mode setting request transmitted from the information processing device 200, the control unit 240 of the information processing device 200 newly determines the contents of the setting (such as resolution/audio quality and a power consumption mode). The control unit 240 of the information processing device 200 then transmits a mode setting request to the information processing device 300, to notify the information processing device 300 of the newly determined contents of the setting (such as resolution/audio quality and a power consumption mode).

The procedures (581 through 583) shown in FIG. 10 are equivalent to the procedures (531 through 533) shown in FIG. 7.

The control unit 370 of the information processing device 300 then transmits a mode status change notification to the information processing device 200, to notify the information processing device 200 of the output format changed by a user (584, 585). This mode status change notification is information for notifying the information processing device 200 of not only the output format ("main" or "sub", for example) changed by a user, but also the resolution/audio quality that can be set by the information processing device 200, compatibility/imcompatibility with the low power consumption mode, and the like.

Receiving the mode status change notification (585), the control unit 240 of the information processing device 200 determines the contents of the setting (such as resolution/audio quality and a power consumption mode). This procedure for determining the contents of the setting is the same as the above described determination procedure. The control unit 240 of the information processing device 200 then transmits a mode change request to the information processing device 300, to notify the information processing device 300 of the determined contents of the setting (such as resolution/audio quality and a power consumption mode) (586, 587).

Receiving the mode change request (587), the control unit 370 of the information processing device 300 determines whether to permit the contents of the setting (such as resolution/audio quality and a power consumption mode) specified by the received mode change request. The control unit 370 of the information processing device 300 then transmits a mode setting permission/prohibition command to the information processing device 200, to notify the information processing device 200 of the result of the determination (588, 589).

Receiving the mode setting permission/prohibition command (589), the control unit 240 of the information processing device 200 checks the contents of the mode setting permission/prohibition command, and sets a transmission mode (590). This checking procedure is the same as the above described checking procedure. Also, the procedures (590 through 595) shown in FIG. 10 are equivalent to the procedures (545 through 550) shown in FIG. 8.

In this case, when performing switching between the sub image and the main image, the source device may incorporate information indicating the timing of the switch (such as information indicating the start of a Group of Pictures (GOP) or information indicating the start of a Picture) into a stream, and then transmit the stream. In other words, when performing switching between the main display and the sub display, the source device may transmit information indicating the timing of the switch to the sink device. In this case, the sink device that has received the stream can perform switching between the sub image and the main image at an appropriate time based on the information indicating the timing.

FIGS. 6 through 10 show examples where standby and wakeup of a source device connected to the sink device are controlled. However, standby and wakeup of the sink device may be controlled based on standby and wakeup of the source devices connected to the sink device. For example, the sink device can be controlled to stand by when all the source devices connected to the sink device are in the standby mode. Also, the sink device can be controlled to wake up when at least one of the source devices connected to the sink device is in the wakeup mode.

In the procedures (565 through 570) shown in FIG. 9, the sink device may notify the source device of a change in the contents of the information held in the procedure (564), and the source device may transmit a mode table request. This modification is shown in FIG. 11.

As shown in FIG. 11, the information processing device 300 notifies the information processing device 200 that the output format has been changed (564), and transmits a mode status notification to prompt transmission of a mode setting request from the information processing device 200 (565, 566). The information processing device 200 that has received the mode status notification transmits a mode status notification acknowledgment indicating acknowledgment of the mode status notification to the information processing device 300, if possible (851, 852).

After the mode status notification acknowledgment is transmitted in the above manner (851), respective procedures are carried out (853 through 858). The respective procedures (853 through 858) are equivalent to the procedures (505 through 510) shown in FIG. 6. After the mode status notification acknowledgment is transmitted in the above manner (851), the respective procedures (853 through 858) are carried out, so that data transmission rate control can be appropriately performed in accordance with a status change (a change of the output format (564)).

In a command prepared according to Wi-Fi CERTIFIED Miracast, for example, a RTSPM5 Message including "wfd-triggered-method" is defined as a command to be transmitted from the information processing device 200 to the information processing device 300 at present. However, if the RTSPM5 Message including "wfd-triggered-method" can be expanded as a command to be transmitted from the information processing device 300 to the information processing device 200, the information processing device 200 receives the RTSPM5 Message including "wfd-triggered-method", and the information processing device 200 can start Capability Re-negotiation with the information processing device 300. That is, management information can be exchanged with the use of the RTSPM5 Message including "wfd-triggered-method". For example, the control unit 370 of the information processing device 300 can perform control so that the RTSPM5 Message including "wfd-triggered-method" defined in the Wi-Fi CERTIFIED Miracast specifications can be transmitted to the information processing device 200 as a command for notifying the information processing device 200 of a change in the management information, if any. Other than those commands, a new command may be defined so that the same procedures as the above can be performed.

[Example Operation of an Information Processing Device (a Source Device)]

Figure 12:
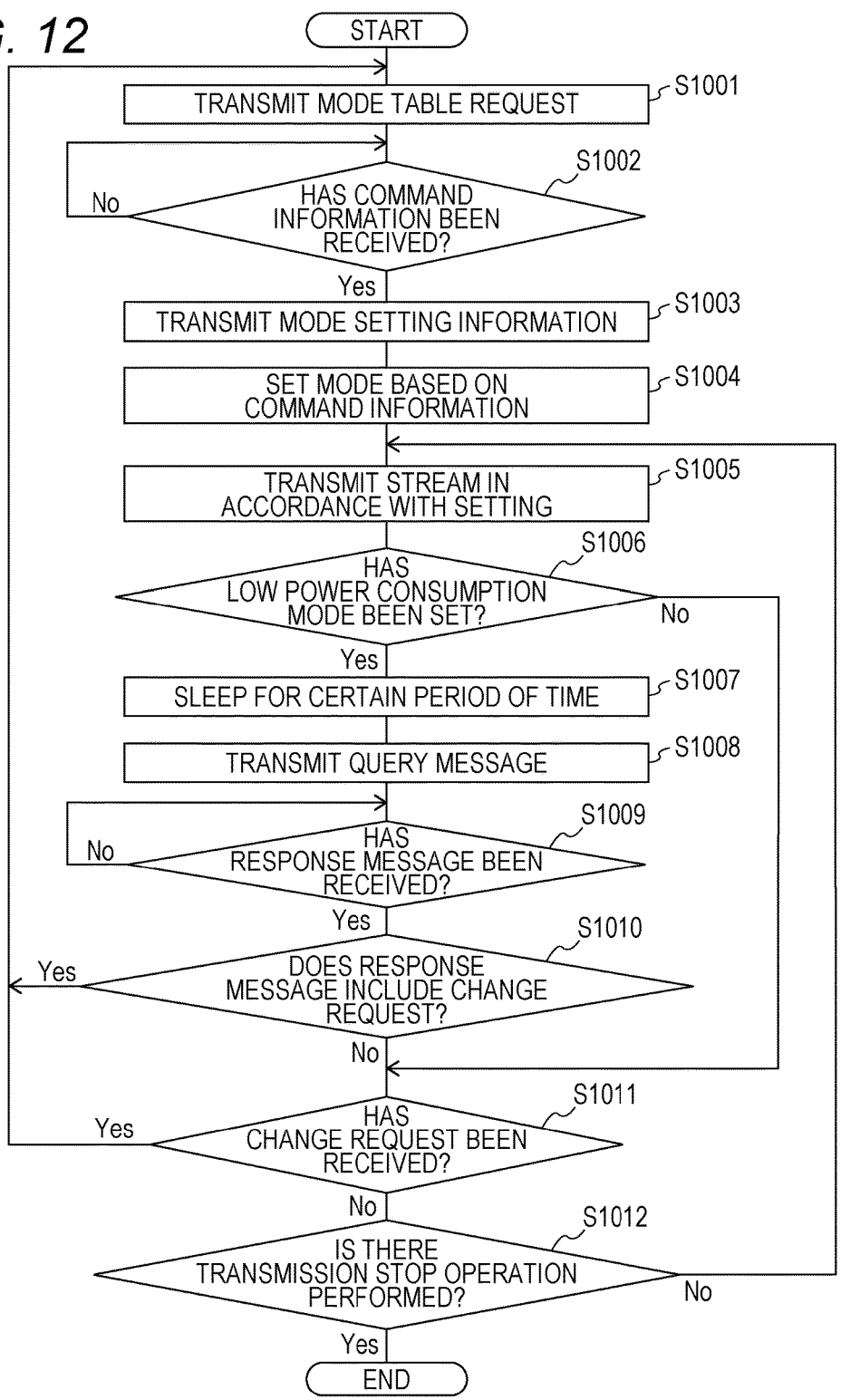
FIG. 12 is a flowchart showing an example of the processing procedures in a data transmission process to be performed by the information processing device 200 in the first embodiment of the present technology.

FIG. 12 is a flowchart showing an example of the processing procedures in a data transmission process to be performed by the information processing device 200 in the first embodiment of the present technology. FIG. 12 shows an example case where the information processing device 200 first transmits a stream (image data and audio data) with a standard resolution to the information processing device 300. In this case, the information processing device 300 receives an output based on the stream.

First, the control unit 240 transmits a mode table request to the information processing device 300 (step S1001). The control unit 240 then determines whether command information has been received from the information processing device 300 (step S1002). If command information has not been received, the control unit 240 continues monitoring. If command information has not been received even after a certain period of standby time, the process may time out and come to an end. For example, according to Wi-Fi CERTIFIED Miracast, a time-out period of five to nine seconds is set depending on circumstances.

If command information has been received from the information processing device 300 (step S1002), the control unit 240 transmits mode setting information indicating that a mode is to be set based on the received command information, to the information processing device 300 (step S1003).

The control unit 240 then sets a mode based on the received command information (step S1004). In a case where a change request designed for increasing resolution is included in the command information, the control unit 240 sets the resolution of the image and the sound in accordance with the change request. In a case where a change request designed for lowering resolution is included in the command information, the control unit 240 sets the resolution of the image and the audio quality of the sound in accordance with the change request.

The control unit 240 then performs a transmission process to transmit a stream to the information processing device 300 in accordance with the setting (step S1005).

The control unit 240 then determines whether the low power consumption mode has been set (step S1006). If the low power consumption mode has not been set (or if the regular power consumption mode has been set), the control unit 240 moves on to step S1011. If the low power consumption mode has been set (step S1006), on the other hand, the control unit 240 sleeps for a certain period of time (step S1007).

The control unit 240 then transmits a query message to the information processing device 300 (step S1008). The control unit 240 then determines whether a response message has been received from the information processing device 300 (step S1009). If any response message has not been received, the control unit 240 continues monitoring. If any response message has not been received even after a certain period of standby time, the process may time out and come to an end. For example, according to Wi-Fi CERTIFIED Miracast, a time-out period of five to nine seconds is set depending on circumstances.

If a response message has been received from the information processing device 300 (step S1009), the control unit 240 determines whether the response message includes a change request (step S1010). If the response message includes a change request (step S1010), the control unit 240 returns to step S1001.

If the response message does not include any change request (step S1010), the control unit 240 determines whether a change request has been received (step S1011). If a change request has been received (step S1011), the control unit 240 returns to step S1001. If any change request has not been received (step S1011), on the other hand, the control unit 240 determines whether a transmission stop operation has been performed (step S1012). If a transmission stop operation has been performed (step S1012), the control unit 240 ends the data transmission process. If any transmission stop operation has not been performed (step S1012), on the other hand, the control unit 240 returns to step S1005.

[Example Operation of an Information Processing Device (a Sink Device)]

Figure 13:
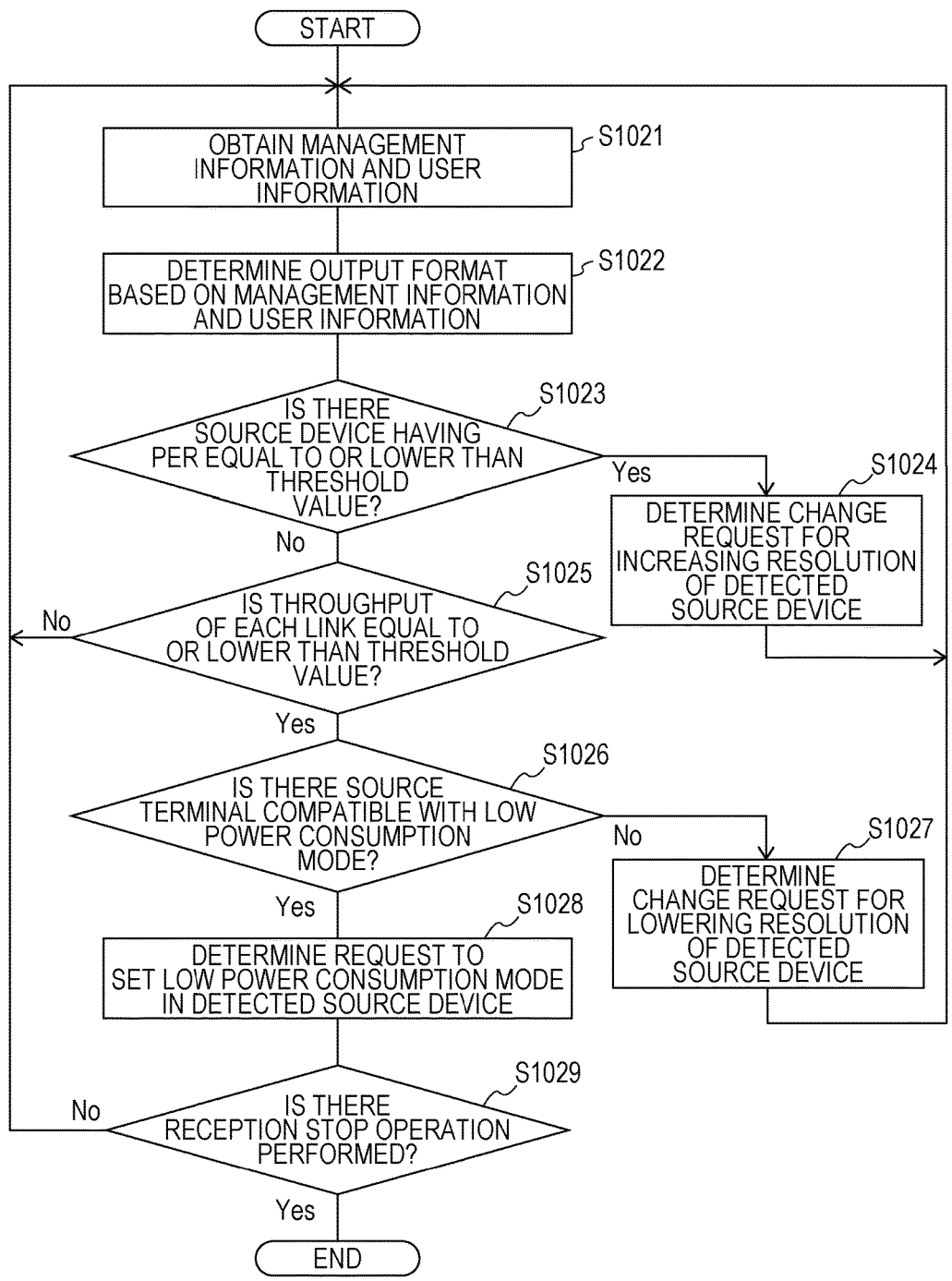
FIG. 13 is a flowchart showing an example of the processing procedures in a data transmission rate control process to be performed by the information processing device 300 in the first embodiment of the present technology.

FIG. 13 is a flowchart showing an example of the processing procedures in a data transmission rate control process to be performed by the information processing device 300 in the first embodiment of the present technology. FIG. 13 shows an example case where the information processing device 300 determines the contents of the settings (such as resolution and power consumption modes) in source devices when streams (image data and audio data) are received.

For example, the control unit 370 of the information processing device 300 can determine the resolution to be used and the frequency channel to be used in accordance with user information for setting a main image and the link radio wave propagation environment between the information processing device 300 and each source device.

For example, a user operation to select the image 12 is performed in the situation shown in a in FIG. 5. In this case, the resolution of the image 12 is preferably increased, and the resolution of the image 11 is preferably lowered. Also, optimum resolutions for the image 11 and the image 12 are preferably selected based on the link radio wave propagation environments of the respective source devices as time proceeds.

For example, the information processing device 300 can determine radio wave propagation characteristics by transmitting data equivalent to the corresponding throughput through more than one frequency channel. The information processing device 300 also holds a table so as to recognize an ideal throughput for each of the frequency channels, for example. The information processing device 300 may also recognize the available data transmission rate in the frequency channel to be used, and select an optimum frequency channel for each frequency channel based on the number of source devices being used at the same time and the PERs.

For example, the control unit 370 obtains management information from the management information holding unit 390, and obtains user information from the user information acquiring unit 360 (step S1021). The control unit 370 then determines an output format based on the obtained management information and user information (step S1022). Images corresponding to two streams transmitted from the respective source devices are displayed on the display unit 351 based on the determined output format.

The control unit 370 then determines whether there is a source device having a PER equal to or lower than a threshold value in the management information (step S1023). If there is a source device having a PER equal to or lower than the threshold value in the management information (step S1023), the control unit 370 determines a change request for increasing the resolution of the source device (step S1024). In accordance with the output format based on the user information, the control unit 370 performs control to assign a high data transmission rate to the main image. This change request is incorporated into command information (the command information shown in FIG. 6, for example), and is then transmitted to the source device. The control unit 370 may determine whether the throughput after the increase of the resolution of the source device is equal to or lower than a threshold value, and control the stream rate based on the result of the determination.

If there are no source devices having a PER equal to or lower than the threshold value in the management information (step S1023), the control unit 370 determines whether the throughput of each source device is equal to or lower than a threshold value based on the management information (step S1025). That is, a check is made to determine whether the throughput of each link has no problem with the current frequency channel (step S1025).

If the throughput of each source device is neither equal to nor lower than the threshold value (step S1025), the control unit 370 returns to step S1021. If the throughput of each source device is equal to or lower than the threshold value (step S1025), on the other hand, the control unit 370 determines whether there is a source device compatible with the low power consumption mode based on the management information (step S1026).

If there is a source device compatible with the low power consumption mode (step S1026), the control unit 370 determines a change request for setting the low power consumption mode in the source device compatible with the low power consumption mode (step S1028). This change request is incorporated into command information (the command information shown in FIG. 6, for example), and is then transmitted to the source device.

If there are no source devices compatible with the low power consumption mode (step S1026), the control unit 370 determines a change request for lowering the resolution of the source device (the source device having a PER equal to or lower than the threshold value) (step S1027). This change request is incorporated into command information (the command information shown in FIG. 6, for example), and is then transmitted to the source device.

A check is made to determine whether a reception stop operation has been performed (step S1029). If a reception stop operation has been performed, the data transmission rate control process is ended. If a reception stop operation has not been performed, the process returns to step S1021. In a case where there is a source device that has been put into a sleep state through the setting of the low power consumption mode, the number of source devices connected to the information processing device 300 becomes smaller. In this case, the threshold of throughput in step S1025 may be changed. Alternatively, after the threshold for throughput is changed, a step equivalent to step S1025 may be further carried out. Step S1021 is an example of the wireless communication step of the claims. Also, steps S1023 through S1028 are an example of the control step of the claims.

In the above manner, it is possible to realize a control protocol in which the sink device trains a line environment for a certain period of time, and notifies the source devices of a resolution that enables stable video communication. Alternatively, it is possible to realize a control protocol in which a source device trains a line environment for a certain period of time and requests a resolution that enables stable video communication, and the sink device responds to the request.

As described above, the control unit 370 of the information processing device 300 can perform data transmission rate control on two streams transmitted from the respective source devices based on the management information in the management information holding unit 390 and the user information acquired by the user information acquiring unit 360.

Control may be performed so as to minimize the total data transmission rate of two streams transmitted from the information processing device 200 and the information processing device 400. For example, the maximum permissible value of the total data transmission rate is set in the control unit 370 of the information processing device 300 on the receiving side. After transmitting a change request for lowering the bit rate to the information processing device 200, the control unit 370 obtains, from the stream receiving unit 330, the bit rates of the two streams transmitted from the information processing devices 200 and 400. The control unit 370 then calculates the total data transmission rate of the obtained two streams. The control unit 370 then determines the bit rate of streams to be transmitted from the information processing device 400 within a range that does not exceed the maximum permissible value. The control unit 370 transmits a change request for increasing the bit rate to the information processing device 400. In a case where the PER is too high to fall within the same frequency channel even if the bit rate is set at the minimum bit rate, another frequency channel may be used. In a case where the images (the main image and the sub image) are fixed over a certain period of time, the image data may be stopped unless an operation (such as pointing) is performed by a user.

As described above, according to the first embodiment of the present technology, appropriate data transmission rate control can be performed in accordance with an operation, a status, or an intension of a user, even in a case where a single sink device receives streams transmitted from source devices. For example, the data transmission rate of one of image and audio streams can be lowered, and the data transmission rates of the other streams can be increased, in accordance with an operation, a status, or an intention of a user.

For example, in a case where a sink device receives and displays streams, important images and sound with high quality can be enjoyed as intended by a user depending on time and circumstances. As for less important images and sound without high quality, the data transmission rates can be automatically adjusted to optimum frequency channels, optimum power consumption, and optimum transmission rates.

As for the management information held in the management information holding unit 390, a command prepared according to Wi-Fi CERTIFIED Miracast can be used in exchanging the management information, for example. In this case, the management information exchange can be performed through capability negotiation or capability re-negotiation defined in the Wi-Fi Display specifications. Here, capability negotiation or capability re-negotiation may be the RFC5939 or Wi-Fi CERTIFIED Miracast specifications, for example. However, capability negotiation or capability re-negotiation is not limited to the above, and defines exchange of device performance information. Examples of exchange using commands according to the Wi-Fi CERTIFIED Miracast specifications are shown in FIGS. 14 through 16.

[Examples of Exchange Using Commands According to the Wi-Fi CERTIFIED Miracast Specifications]

Figure 14:
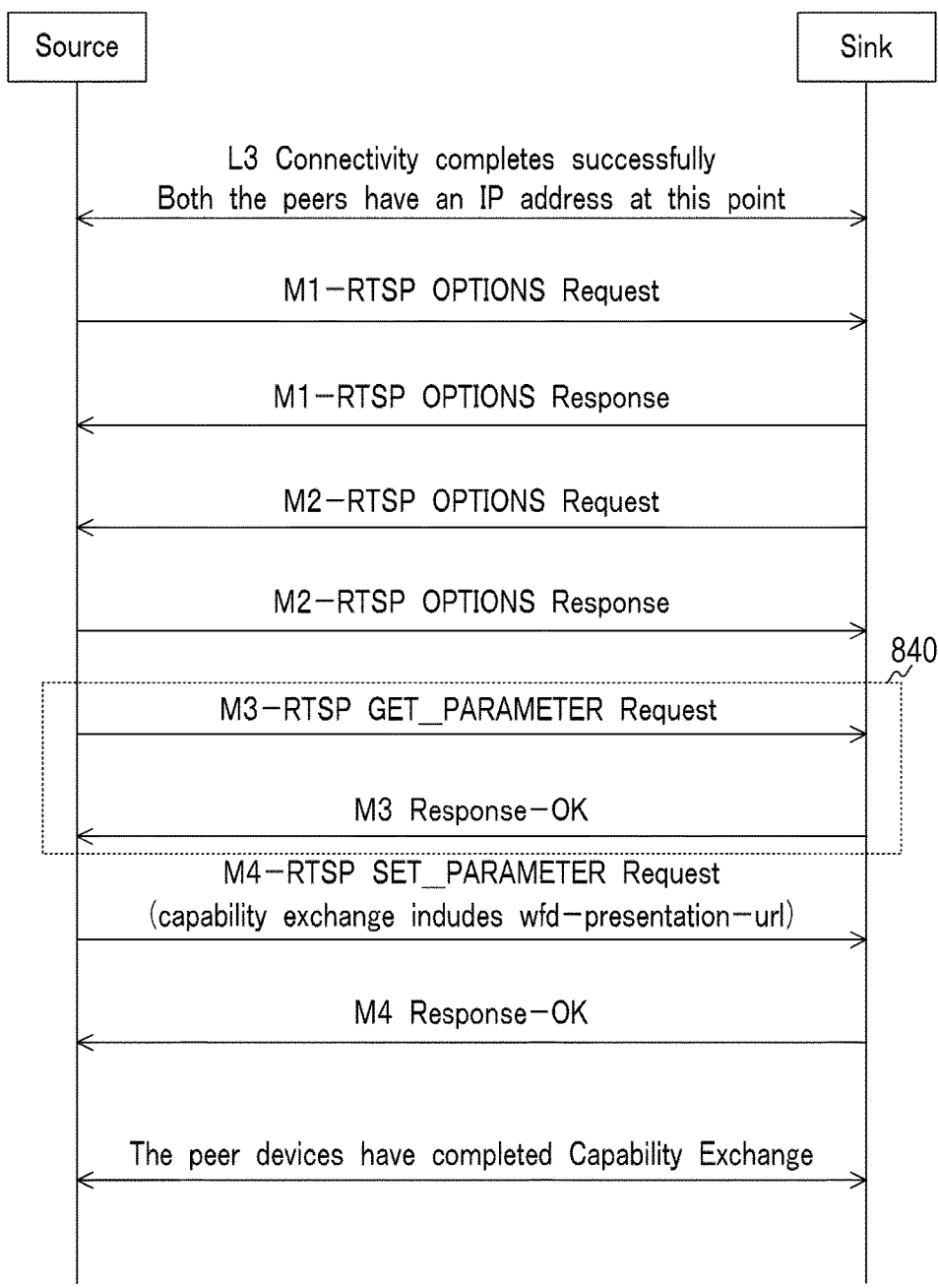
FIG. 14 is a sequence chart of an example of a communication process to be performed between a source device and a sink device in the first embodiment of the present technology.
Figure 15:
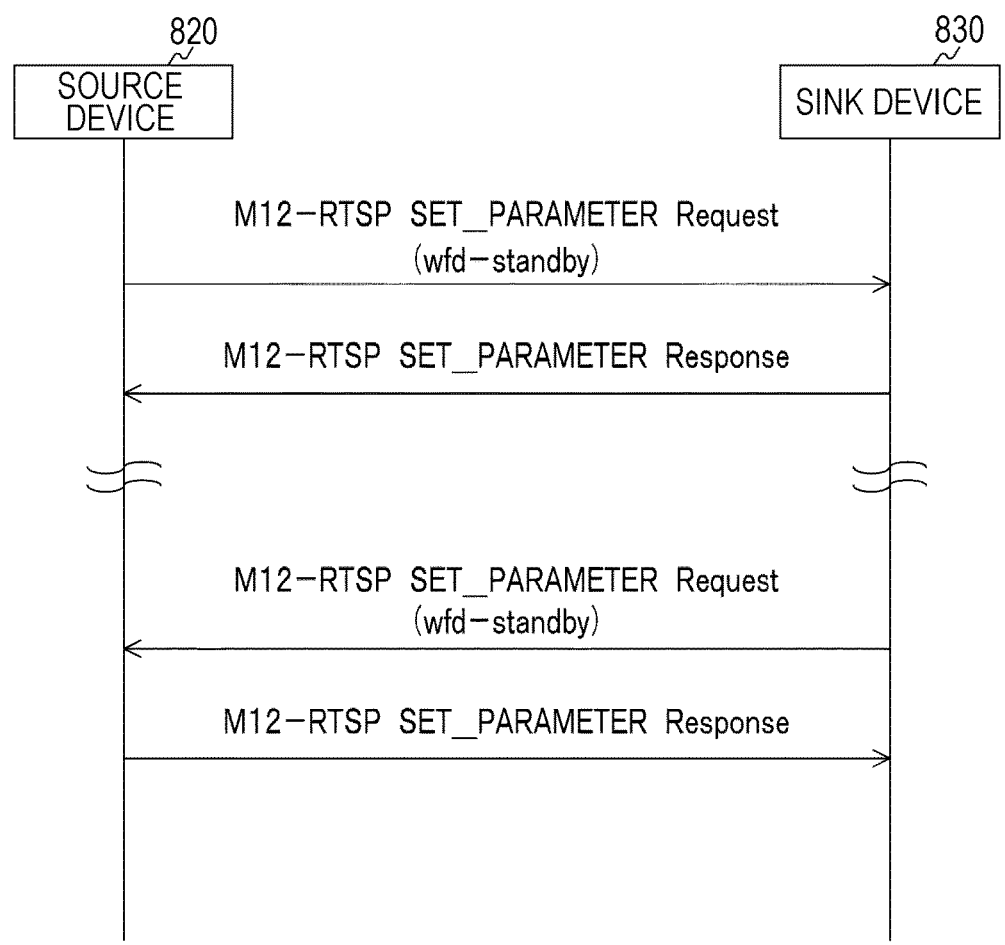
FIG. 15 is a sequence chart of an example of a communication process to be performed between a source device and a sink device in the first embodiment of the present technology.
Figure 16:
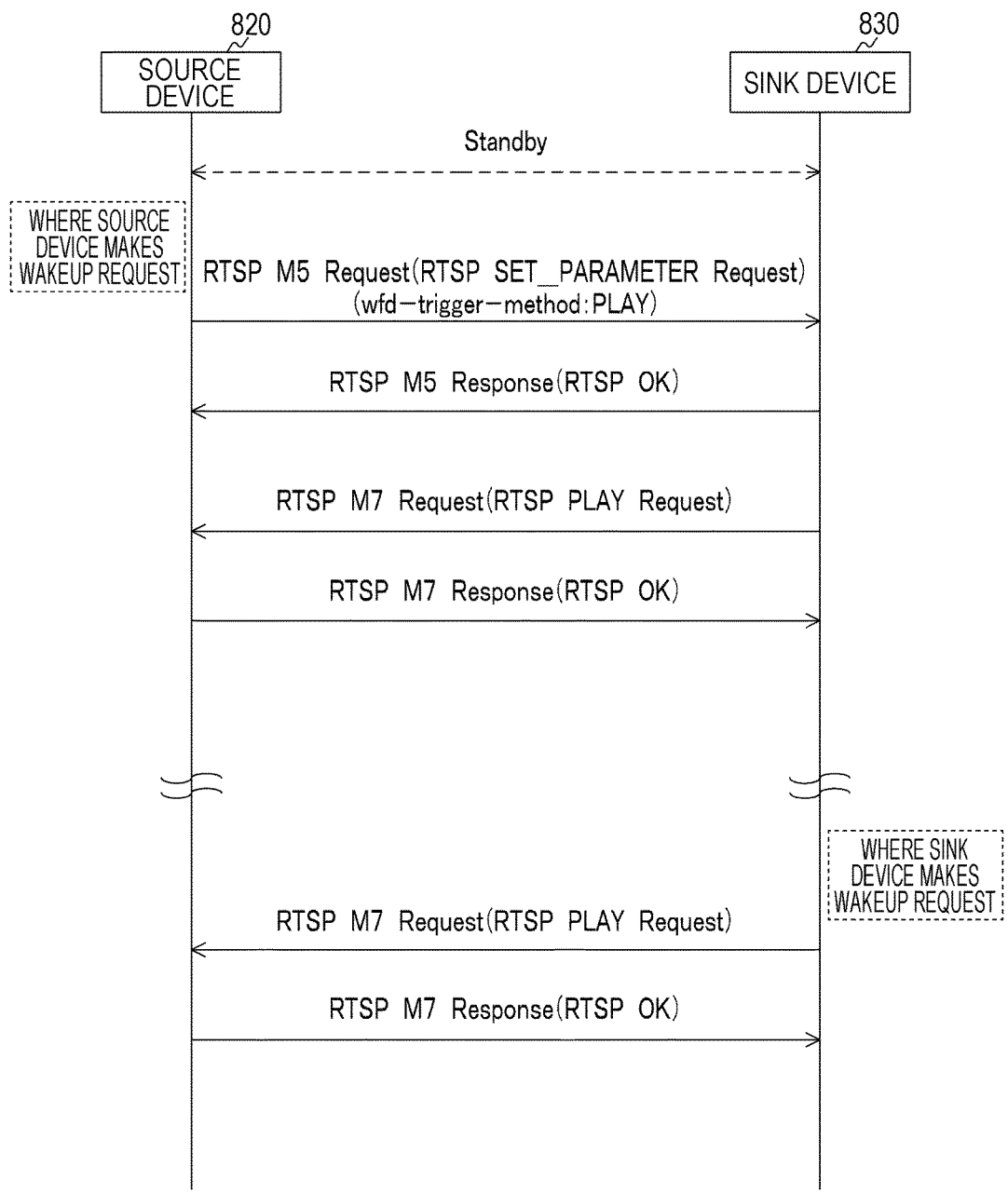
FIG. 16 is a sequence chart of an example of a communication process to be performed between a source device and a sink device in the first embodiment of the present technology.

FIGS. 14 through 16 are sequence charts of examples of communication processes to be performed between a source device and a sink device in the first embodiment of the present technology. FIGS. 14 through 16 show examples of exchange using the RTSP protocol. A source device 820 is equivalent to the information processing device 200 or 400, and a sink device 830 is equivalent to the information processing device 300.

First, an example is described with reference to FIG. 14. As shown in a rectangle 840 indicated by a dashed line in FIG. 14, it is possible to use the "RTSP M3 Request" (RTSP GET_PARAMETER Request) message to be transmitted from the source device to the sink device, and the "RTSP M3 Response" (RTSP GET_PARAMETER Response) message to be transmitted from the sink device to the source device in response to the "RTSP M3 Request" message. This exchange process is equivalent to the procedures (505 through 508) shown in FIG. 6 and the procedures (539 through 542) shown in FIG. 8, for example. Meanwhile, the source device may perform transmission to the sink device as appropriate. For example, the exchange of the "RTSP M3 Request" (RTSP GET_PARAMETER Request) message and the "RTSP M3 Response" (RTSP GET_PARAMETER Response) message may be skipped. Instead, management information may be incorporated into a message to be transmitted from the source device to the sink device, and be then transmitted from the source device to the sink device, and the sink device may select information and hold the information in the management information holding unit 390.

The exchange of information about power consumption mode can be performed with a predetermined message using the RTSP protocol. For example, the three kinds of management information exchange (1) through (3) shown below can be performed.

(1) "Setting of the standby mode"
(2) "The case where the source device cancels the standby mode, or the case where the source device cancels the standby mode of the sink device"
(3) "The case where the sink device cancels the standby mode, or the case where the sink device cancels the standby mode of the source device"

First, an example is described with reference to FIG. 15. In a case where commands prepared according to Wi-Fi CERTIFIED Miracast are used, for example, the "RTSP M12 Request" (RTSP SET_PARAMETER (with WFD-standby)) message to be transmitted from the source device 820 to the sink device 830, and the "RTSP M12 Response" (RTSP OK) message to be transmitted from the sink device 830 to the source device 820 in response to the "RTSP M12 Request" message can be used in (1) "setting of the standby mode" mentioned above. The setting of the standby mode from the sink device 830 to the source device 820 is the same as above.

Next, another example is described with reference to FIG. 16. In (2) "the case where the source device cancels the standby mode, or the case where the source device cancels the standby mode of the sink device" mentioned above, for example, the source device 820 exchanges the "RTSP M5 Request" (RTSP SET_PARAMETER(Request (wfd-trigger-method: PLAY)) message to be transmitted to the sink device 830, and the "RTSP M5 Response" (RTSP OK) message to be transmitted from the sink device 830 to the source device 820 in response to the "RTSP M5 Request" message. The sink device 830 can use the "RTSP M7 Request" (RTSP PLAY Request) message to be transmitted to the source device 820, and the "RTSP M7 Response" (RTSP OK) message to be transmitted from the source device 820 to the sink device 830 in response to the "RTSP M7 Request" message.

In (3) "the case where the sink device cancels the standby mode, or the case where the sink device cancels the standby mode of the source device" mentioned above, for example, the sink device 830 can use the "RTSP M7 Request" (RTSP PLAY Request) message to be transmitted to the source device 820, and the "RTSP M7 Response" (RTSP OK) message to be transmitted from the source device 820 and the sink device 830 in response to the "RTSP M7 Request" message. These exchange processes are equivalent to the procedures (515 through 518) shown in FIG. 7 and the procedures (535 through 538) shown in FIG. 7, for example.

In the exchange in the procedures (565 through 570) shown in FIG. 9, for example, it is possible to use the "RTSP M12 Request" (RTSP SET_PARAMETER (with WFD-standby)) message to be transmitted from the sink device 830 to the source device 820, and the "RTSP M12 Response" (RTSP OK) message to be transmitted from the source device 820 to the sink device 830 in response to the "RTSP M12 Request" message.

Further, in the exchange in the procedures (584 through 589) shown in FIG. 10, for example, it is possible to use the "RTSP M7 Request" (RTSP PLAY Request) message to be transmitted from the sink device 830 to the source device 820, and the "RTSP M7 Response" (RTSP OK) message to be transmitted from the source device 820 to the sink device 830 in response to the "RTSP M7 Request" message.

As described above, the wireless communication unit 320 can perform exchange of the capability information through capability negotiation or capability re-negotiation defined in the Wi-Fi Display specifications. Also, the capability information is exchanged in a RTSP M3 Message in capability negotiation or capability re-negotiation, for example.

As described above, the wireless communication unit 320 of the information processing device 300 performs communication with the source device so as to exchange the capability information about the information processing device 300 and the capability information about the information processing device 200, for example. Also, the wireless communication unit 220 of the information processing device 200 performs communication with the information processing device 300 so as to exchange the capability information about the information processing device 200 and the capability information about the information processing device 300. In these cases, the wireless communication units 220 and 320 can perform exchange of the capability information through capability negotiation or capability re-negotiation.

The control unit 370 of the information processing device 300 performs data transmission rate control on streams with the information processing device 200 based on the capability information about the information processing device 200, the radio wave propagation measurement information about communication with the information processing device 200, and the manner of use of the information processing device 300. Also, under the control of the information processing device 300 based on the capability information about the information processing device 200 and the radio wave propagation measurement information about stream communication with the information processing device 300, the control unit 240 of the information processing device 200 can perform data transmission rate control on streams with the information processing device 300, though the stream transmission method differs from that of the embodiment of the present technology.

The control unit 370 of the information processing device 300 performs control to set a power consumption mode in the information processing device 200 based on the capability information about the information processing device 200 (such as the information indicating whether the information processing device 200 is a mobile device). In this case, the control unit 370 can perform control to set the low power consumption mode in the information processing device 200 based on the capability information about the information processing device 200 and the management information for managing the information processing device 200. The control unit 240 of the information processing device 200 also sets a power consumption mode under the control of the information processing device 300 based on the capability information about the information processing device 200. Although an example of topology in which the number of source devices is two has been described in the embodiment of the present technology, the present technology is not limited to this embodiment of the present technology. For example, if the number of source devices is two or larger, it is necessary to perform data transmission rate control for each of the source devices. As a result, state transition often occurs, and the control becomes difficult. Still, the existence of two or more source devices is beneficial. The present technology can be applied to topology in which two or more source devices are connected.

2. Second Embodiment

In the above described first embodiment of the present technology, control on wireless communication is performed based on user information and management information. In a case where a source device is a mobile device, for example, the source device probably moves around. In such a case, the source device might move out of the area depending on the frequency channel. In such a case, it is critical to set an appropriate frequency channel and realize stable transmission.

In view of this, a second embodiment of the present technology shows an example where an appropriate frequency channel is set for a source device that can use more than one frequency channel.

[Example Configuration of a Communication System]

Figure 17:
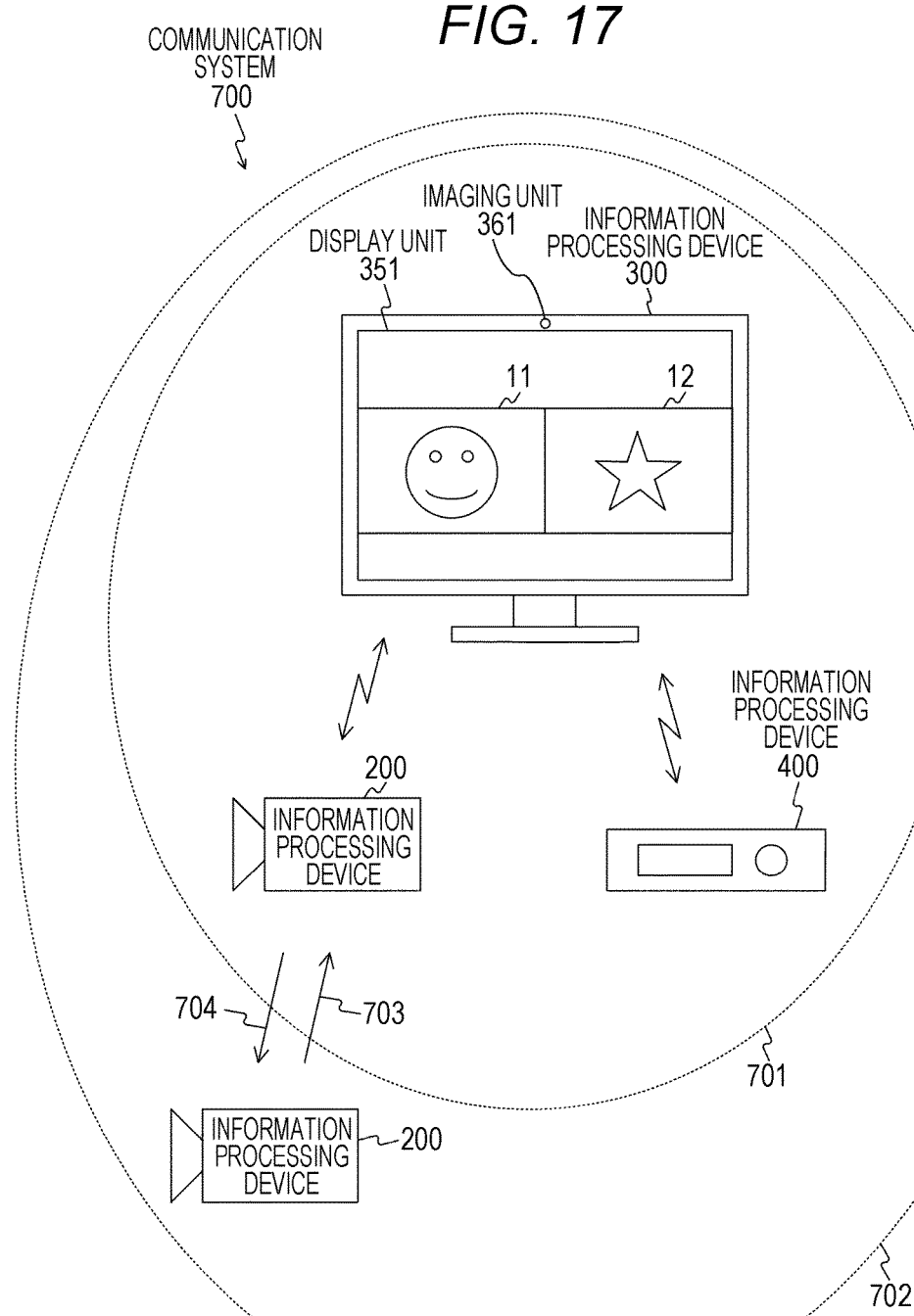
FIG. 17 is a block diagram showing an example system configuration of a communication system 700 in a second embodiment of the present technology.

FIG. 17 is a block diagram showing an example system configuration of a communication system 700 in the second embodiment of the present technology.

The configuration of the communication system 700 is the same as the configuration of the communication system. 100 shown in FIG. 1. Therefore, the same components as those of the communication system 100 shown in FIG. 1 are denoted by the same reference numerals as those used in FIG. 1, and explanation of them will be partially skipped in the description below.

However, FIG. 17 differs from FIG. 1 in that the radio wave reachable regions of two different frequency channels are shown as the radio wave reachable regions (service areas) of the information processing device 300 by ellipses 701 and 702 drawn with dotted lines. For example, a first frequency channel is a 60 GHz band, and the radio wave reachable region of the first frequency channel is represented by the ellipse 701. A second frequency channel is a 2.4 GHz band, and the radio wave reachable region of the second frequency channel is represented by the ellipse 702.

Here, the radio wave reachable region 701 means the region (service area) in which the information processing devices 200 and 400 are supposedly able to transmit streams to the information processing device 300 through the first frequency channel. The radio wave reachable region 702 means the region (service area) in which the information processing devices 200 and 400 are supposedly able to transmit streams to the information processing device 300 through the second frequency channel.

FIG. 17 shows an example case where the information processing device 200 is a mobile device, and the information processing device 200 moves around. In this example case, when the information processing device 300 and the information processing device 400 are transmitting streams, the information processing device 200 and the information processing device 300 conduct a connection process.

As described above, the information processing device 200 is movable. Therefore, as indicated by an arrow 703, for example, at the start of a connection process with the information processing device 300, the information processing device 200 might exist outside the radio wave reachable region 701. However, while the connection process is being performed, the information processing device 200 might move into the radio wave reachable region 701. Also, as indicated by an arrow 704, for example, at the start of a connection process with the information processing device 300, the information processing device 200 might exist inside the radio wave reachable region 701. However, while the connection process is being performed, the information processing device 200 might move out of the radio wave reachable region 701.

In a case where the information processing device 200 exists on the boundary of a radio wave reachable region (a service area boundary line) during a wireless communication connection process, the connection process might take a long time, and an image transmitted in a stream might be disturbed. In this case, wireless communication through the other link sharing the same band (such as the link between the information processing device 400 and the information processing device 300) might be affected.

Therefore, so as to cope with the connection environment shown in FIG. 17, the session connecting process between the information processing device 200 and the information processing device 300 preferably uses the frequency band with the larger service area between the two frequency channels. In the second embodiment of the present technology, the second frequency channel (2.4 GHz band) having the larger service area between the two frequency channels is used, for example.

That is, when the communication quality specified by the radio wave propagation measurement information is degraded, and there is the need to limit data transmission rate control, the control unit 370 can perform control to change the frequency channel being used to a frequency channel with a higher data transmission rate based on the radio wave propagation measurement information and the manner of use of the information processing device 300. When the communication quality specified by the radio wave propagation measurement information is degraded, and there is the need to limit data transmission rate control, the control unit 370 can also perform control to change the frequency channel being used to a frequency channel with a lower data transmission rate based on the radio wave propagation measurement information and the manner of use of the information processing device 300. For example, when the communication quality specified by the radio wave propagation measurement information is degraded, and there is the need to limit data transmission rate control, the frequency channel is switched from the second frequency channel being used to the first frequency channel so that a higher data transmission rate is achieved based on the radio wave propagation measurement information and the manner of use of the information processing device 300. To achieve a lower data transmission rate, on the other hand, the frequency channel is switched from the first frequency channel being used to the second frequency channel. In this embodiment of the present technology, not only the switching of frequency channels but also some other methods may be used. For example, data transmission rate control can be performed by changing bandwidths. In an example case, several bandwidths are supported according to 802.11, and there exist the 20 MHz width, the 40 MHz, width, the 80 MHz width, the 160 MHz width, and the like. As the bandwidth becomes larger, the data transmission rate becomes higher. Therefore, when the communication quality specified by the radio wave propagation measurement information is degraded, and there is the need to limit data transmission rate control, the control unit 370 may perform control to increase or reduce the bandwidth. As described above, the capability setting is comprehensively performed in the information processing device 200 based on the manner of use of the information processing device 300 (such as the display format of the display unit 351 and the moving state of the information processing device 300) and the radio wave propagation environment. Accordingly, the stability of the entire system can be increased.

In a case where the information processing device 200 moves in the direction of the arrow 704, the information processing device 200 moves in such a direction that the quality of wireless communication becomes lower. Since it is difficult to cope with narrowed throughput and lowered quality, the frequency channel needs to be changed.

In a case where the information processing device 200 moves in the direction of the arrow 704, a user may be made to issue an instruction to increase the image quality and the audio quality of the other link by cutting off the information processing device 200, or an instruction to change the frequency channel of the information processing device 200 without cutting off the information processing device 200. For example, a pop-up for issuing a permission to increase the image quality and the audio quality of the other link by cutting off the information processing device 200 may be displayed on the information processing device 300, and the pop-up can cause a user to issue an instruction. Also, in a case where an indication as to whether the pop-up is to be displayed on the information processing device 200 is displayed on the information processing device 300, and an instruction to display the pop-up on the information processing device 200 is issued, for example, the pop-up may be displayed on the information processing device 200. In this case, the user of the information processing device 200 can issue an instruction. Also, so as to secure more stable links, it is preferable to start communication by selecting a communication method having a lower transmission rate than a high-transmission-rate communication method at the start of a connection process.

In a case where the cutoff is permitted through the pop-up, for example, the information processing device 300 performs a process for suspending stream transmission to and from the information processing device 200 until the link radio wave propagation state improves. In this case, the management information about the information processing device 200 held in the management information holding unit 390 is erased.

Also, in a case where the cutoff is not permitted through the pop-up, for example, the information processing device 300 performs a process for changing the frequency channel of the information processing device 200.

As described above, the control unit 370 can perform control to cause the display unit 351 to display the display information (such as a pop-up) indicating whether to permit cutoff of the frequency channel being used. In a case where a user operation indicating prohibition of cutoff of the frequency channel being used is accepted, the control unit 370 performs control to switch frequency channels.

In the above described example, a user is made to issue an instruction when the information processing device 200 moves in the direction of the arrow 704. It is also possible to determine beforehand how to perform the process in the above described situation.

In a situation where stream transmission is being conducted through the link between the information processing device 400 and the information processing device 300, for example, the process needs to be performed so as not to affect the stream transmission through the other link. Therefore, it is preferable to determine the setting in advance, rather than causing a user to issue an instruction when the information processing device 200 moves. In this case, links are automatically switched, and therefore, image quality is degraded due to a change in resolution. In view of this, "2.4 G", "60 G", or the like may be displayed to notify the user of the status of the link change.

There might be an operating environment in which the information processing device 200 frequently moves between the radio wave reachable region 701 and the radio wave reachable region 702. In view of this, an example where switching between the first frequency channel and the second frequency channel is performed at high speed is described below.

[Example of Acquisition of Management Information]

Figure 18:
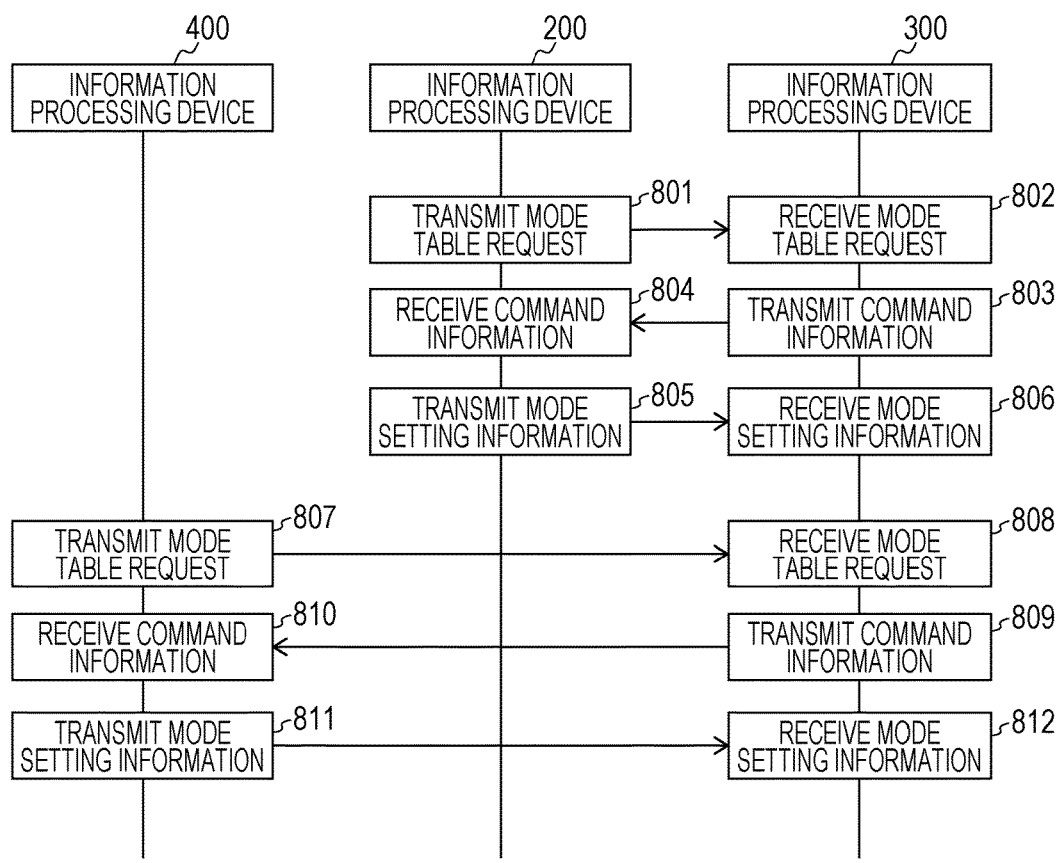
FIG. 18 is a sequence chart of an example of communication processes to be performed among the devices in the communication system 700 in the second embodiment of the present technology.

FIG. 18 is a sequence chart of an example of communication processes to be performed among the devices in the communication system 700 in the second embodiment of the present technology. FIG. 18 shows an example where the information processing device 300 obtains the management information about the information processing device 200 and the management information about the information processing device 400.

The procedures (801 through 806) and the procedures (807 through 812) shown in FIG. 18 are equivalent to the procedures (505 through 510) shown in FIG. 6.

Although FIG. 18 shows the same example of acquisition of the management information as that of the first embodiment of the present technology, the management information about each information processing device may be acquired in a different manner.

[Example Operation of an Information Processing Device]

Figure 19:
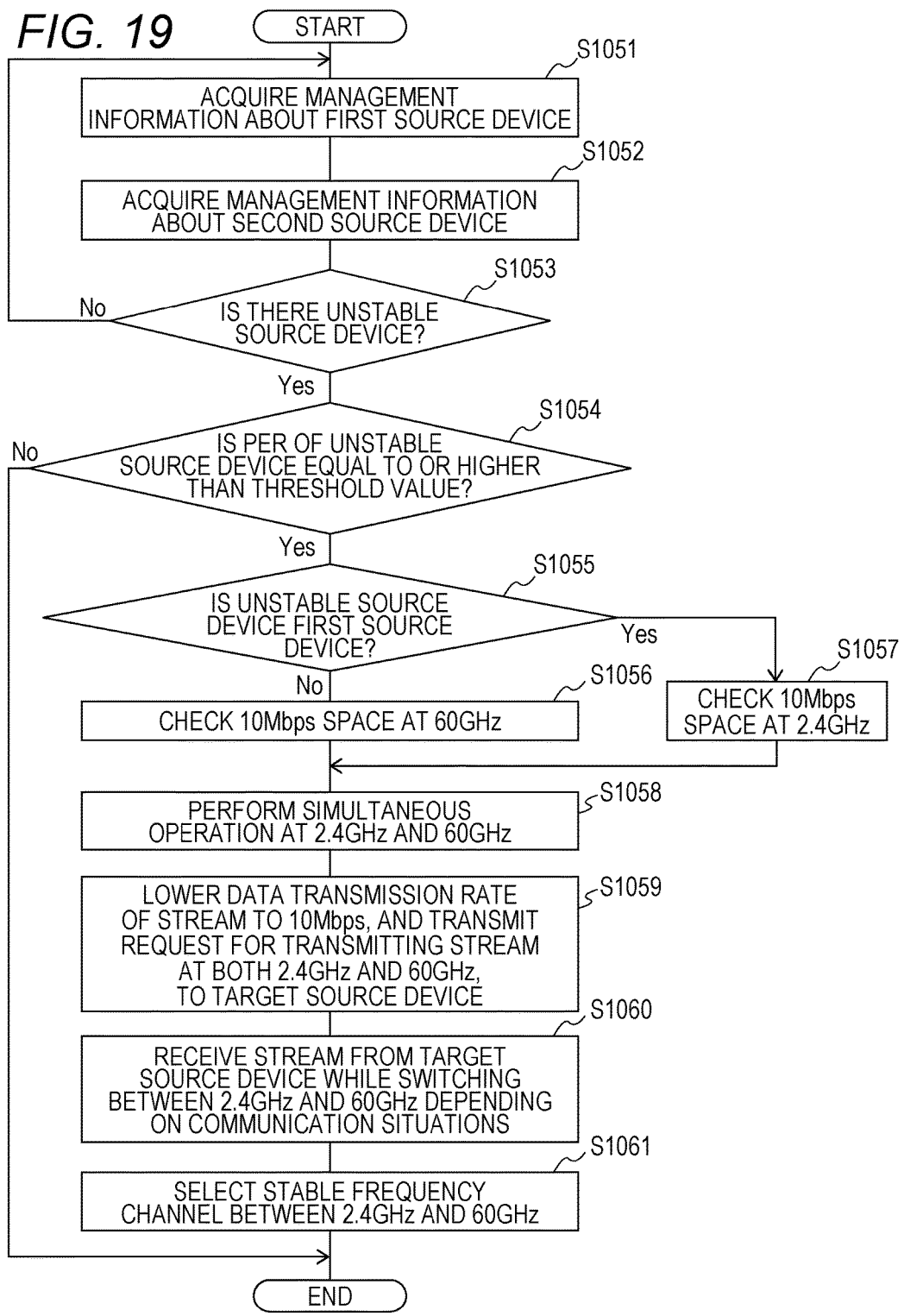
FIG. 19 is a flowchart showing an example of the processing procedures in a frequency channel setting process to be performed by an information processing device 300 in the second embodiment of the present technology.

FIG. 19 is a flowchart showing an example of the processing procedures in a frequency channel setting process to be performed by the information processing device 300 in the second embodiment of the present technology. FIG. 19 shows an example case where the information processing device 300 connects a link (a first link) to the information processing device 200, and connects a link (a second link) to the information processing device 300. At the time when the processing procedures shown in FIG. 19 are started, the first link is conducting content transmission using the first frequency channel, and the second link is conducting content transmission using the second frequency channel. FIG. 19 also shows a connection setting where a check is made to determine whether both of the two frequency channels have a problem in terms of data transmission rates, and switching between the two frequency channels is performed at high speed while attention is being paid to the data transmission rate of the other link.

First, the control unit 370 acquires the management information about a first source device (the information processing device 200) (step S1051). The control unit 370 then acquires the management information about a second source device (the information processing device 400) (step S1052). The respective pieces of the management information are held in the management information holding unit 390. The management information acquisition method is shown in FIG. 18.

The control unit 370 determines whether the respective source devices connected to the information processing device 300 are unstable (step S1053). If there is an unstable source device, the image displayed on the display unit 351 is disturbed, for example. If all the source devices are not unstable (step S1053), the process returns to step S1051.

If one of the source devices is unstable (step S1053), a check is made based on the stability of the link to the unstable source device (target source device) (step S1054). For example, the control unit 370 determines whether the PER of the source device is equal to or higher than a threshold value (step S1054). If the PER of the source device is lower than the threshold value, the link to the source device can be determined to be stable. Accordingly, the frequency channel setting process comes to an end.

Although the PER is used as the index in determining the stability of the link in this example, some other index may be used. For example, the BER, the RSSI, the PER, the number of packet retransmissions, the throughput, drop frames, the SIR, or the like may be used in determining the stability of the link. Further, the receiving side may detect a delay of a packet to be received, and use the information related to this packet delay as the radio wave propagation measurement information. This packet delay serves as an index related to radio wave propagation, since a delay is caused in transmission to the receiving side through a retransmission process in layer 2 when an error occurs, for example. Further, a packet delay serves as an index indicating that some link characteristics are degraded in a wireless system in which a radio band is shared among devices, for example.

If the PER of the source device is equal to or higher than the threshold value (step S1054), the control unit 370 checks the unstable link (step S1055). That is, the control unit 370 determines whether the source device is the first source device (step S1055). A check is then made to determine whether there is a space in a different frequency channel from the frequency channel being currently used by the source device (step S1056, S1057).

If the source device is the second source device (step S1055), for example, a check is made to determine whether there is a space in a different frequency channel from the frequency channel being currently used by the second source device (step S1056). If the source device is the first source device (step S1055), a check is made to determine whether there is a space in a different frequency channel from the frequency channel being currently used by the first source device (step S1057).

As described above, 2.4 GHz and 60 GHz are used as frequency channels in the second embodiment of the present technology. The data transmission rates of the two frequency channels are assumed to be 10 or more times higher. However, in the description below, the maximum throughput of the two frequency channels is assumed to be 30 Mbps, for ease of explanation.

After a space in terms of the data transmission rate is checked (step S1056, S1057), the control unit 370 performs a simultaneous operation at 2.4 GHz and 60 GHz on the unstable link (step S1058). If the first source device (the information processing device 200) is unstable, for example, the first source device (the information processing device 200) is made to newly use 2.4 GHz and conduct stream communication while switching between 60 GHz and 2.4 GHz. So as to enable seamless switching between 60 GHz and 2.4 GHz in this case, the data transmission rate of streams needs to be lowered to 10 Mbps. In a situation where switching between 60 GHz and 2.4 GHz is performed, streams such as images and sound can be generated, with no attention being paid to radio waves. However, the present technology is not limited to this embodiment of the present technology. For example, streams with different throughputs may be generated at 60 GHz and 2.4 GHz, and be switched while being synchronized. Such a process can be realized with the use of a low-delay codec, for example.

In view of the above, the control unit 370 lowers the data transmission rate of streams to 10 Mbps, and transmits a request for performing transmission of streams while switching between 60 GHz and 2.4 GHz, to the target source device (the information processing device 200, for example) (step S1059). In this manner, the control unit 370 performs control to limit the data transmission rate prior to switching of the frequency channel being used to another frequency channel.

While switching between 60 GHz and 2.4 GHz depending on communication situations, the information processing device 300 receives a stream from the target source device that has transmitted the request (step S1060).

The control unit 370 then selects the more stable frequency channel between 60 GHz and 2.4 GHz. The control unit 370 then transmits a request for performing stream transmission using the selected frequency channel, to the target source device (the information processing device 200, for example) (step S1060). As a result, a stable link is selected, and stable stream communication can be performed.

Respective threshold values may be changed depending on whether the source device is a mobile device. In a case where the source device is a mobile device, switching is facilitated so that stable transmission can be realized.

In a case where the source device to be subjected to a frequency channel change (the target source device) is a mobile device, the battery is easily drained if two frequency channels are simultaneously used. Therefore, the information processing device 200 may make a determination based on information received from the information processing device 300. In making this determination, the information processing device 200 needs to acquire respective pieces of information in which the link information about all the source devices connected to the information processing device 300 is incorporated beforehand into the information (the command information shown in FIG. 6, for example) transmitted from the information processing device 300. By doing so, the information processing device 200 can select a stable frequency based on the acquired information about all the source devices. The information processing device 200 can also determine whether the other link will not be affected. Also, management information indicating that the information processing device 200 is a mobile device may be sent to the information processing device 300 in advance so that the information processing device 300 can determine the frequency channel conducting stable stream transmission based on the data transmission rate control information about the entire system.

As described above, the information processing device 200 and the information processing device 300 are information processing devices that can perform wireless communication using more than one frequency channel. The control unit 370 of the information processing device 300 performs control to set one of the frequency channels in the information processing device 200 based on the capability information about the information processing device 200 and the radio wave propagation measurement information. In this case, the control unit 370 of the information processing device 300 can perform control to set a frequency channel based on the radio wave propagation measurement information obtained by measuring streams from the information processing device 200 while switching between the frequency channels is being performed.

In the second embodiment of the present technology, the first frequency channel is the 60 GHz band, and the second frequency channel is the 2.4 GHz. However, the present technology is not limited to this example. For example, the first frequency channel may be the 5 GHz, and the second frequency channel may be the 2.4 GHz.

Also, in the second embodiment of the present technology, two kinds of frequency channels are used. However, the present technology is not limited to this example. For example, the present technology can be applied in cases where some other two kinds of frequency channels (such as LTE-A and 2.4 GHz, or LTE-A and 60 GHz) are used. The present technology can also be applied in cases where three or more kinds of frequency channels are used, for example. The present technology can also be applied to an information processing device that uses the three frequency channels of 2.4 GHz, 5 GHz, and 60 GHz, for example.

As described above, according to the embodiment of the present technology, in a sink device that performs outputting based on streams from source devices, unnecessary power consumption can be reduced by stream resolution adjustment, transmission suspensions, and frequency channel changes. Accordingly, communication suitable for mobile devices can be realized. Also, the band usage efficiency of the frequency channels can be increased, and communication with increased robustness can be realized.

That is, as the sink device that manages more than one link also performs scheduling, battery power consumption of each mobile device can be reduced. Also, the scheduling of the entire system can be performed so that a mobile device that can use more than one frequency channel will use only one frequency channel. Also, even in topology that requires switching between different frequency channels, the switching is facilitated by device information (indicating whether the device is a mobile device, for example) so that stable transmission can be realized. Even if there is a difference between frequency channels, respective pieces of information (management information and user information) can be appropriately exchanged. Although an example of topology in which the number of source devices is two and two links exist has been described in the embodiment of the present technology, the present technology is not limited to this embodiment of the present technology. For example, if the number of source devices is two or larger, it is necessary to perform data transmission rate control for each of links corresponding to the source devices. As a result, state transition often occurs, and the control becomes difficult. Still, the existence of two or more source devices is beneficial. The embodiment of the present technology can also be applied to topology in which two or more source devices are connected, for example.

The embodiments of the present technology can also be applied to other devices having a wireless communication function. For example, the embodiments of the present technology can be applied to imaging devices having a wireless communication function (such as a digital still camera or a digital video camera (a camcorder, for example)). The embodiments of the present technology can also be applied to display devices having a wireless communication function (such as a television receiver, a projector, or a personal computers), or portable information processing devices (such as a smartphone or a tablet terminal), for example.

3. Applications

The technology according to the present disclosure can be applied to various products. The information processing devices 200, 300, and 400 can be realized as mobile terminals such as smartphones, tablet Personal Computers (PCs), notebook PCs, portable game terminals, or digital cameras, fixed terminals such as television receivers, printers, digital scanners, or network storages, or in-vehicle terminals such as car navigation devices. The information processing devices 200, 300, and 400 may also be realized as terminals that perform Machine To Machine (M2M) communication (these terminals are also called Machine Type Communication (MTC) terminals), such as smart meters, vending machines, remote monitoring devices, or Point Of Sale (POS) terminals. Further, the information processing devices 200, 300, and 400 may be wireless communication modules installed in those terminals (such as integrated circuit modules each formed with a single die).

[3-1. First Application]

Figure 20:
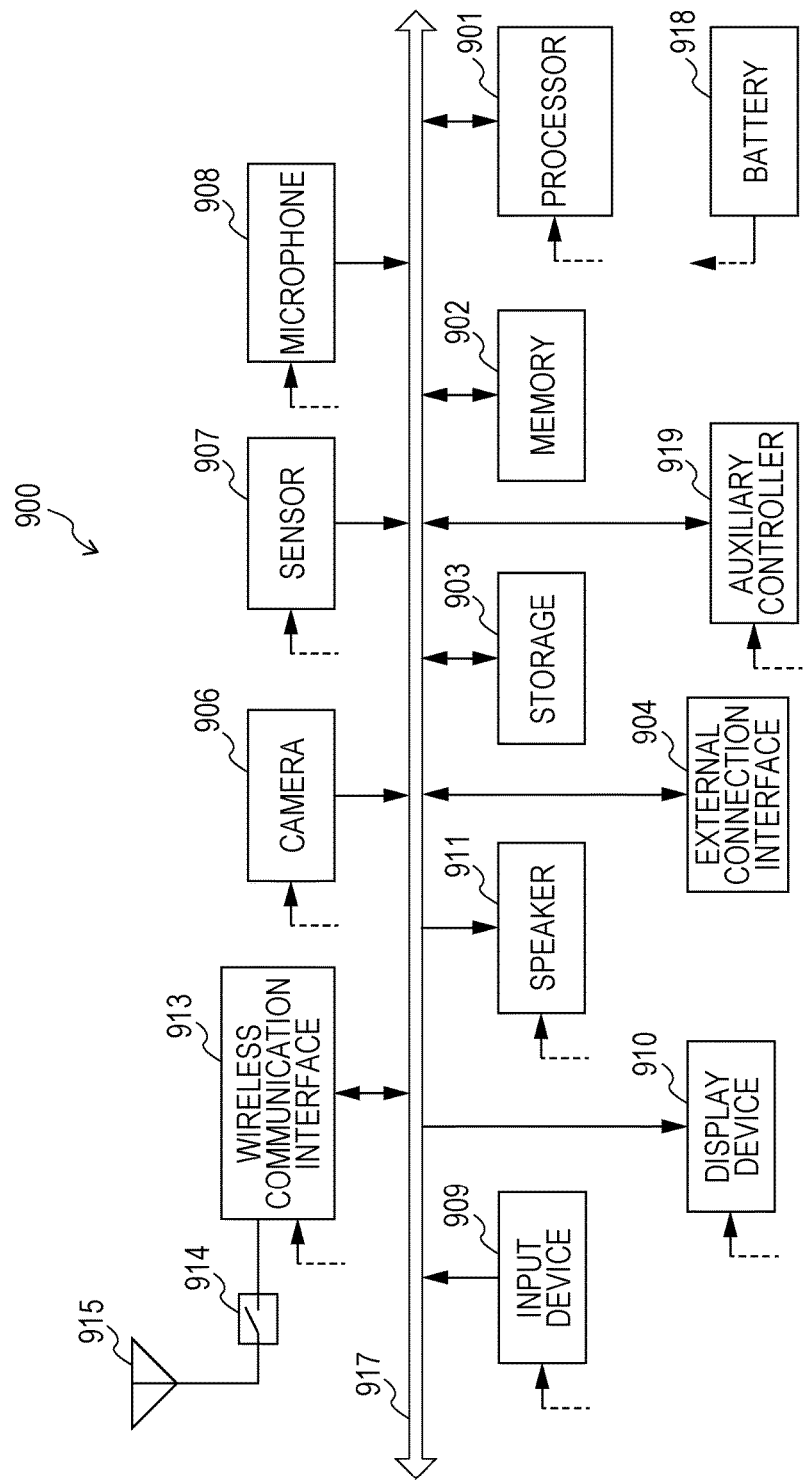
FIG. 20 is a block diagram schematically showing an example structure of a smartphone.

FIG. 20 is a block diagram schematically showing an example structure of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be a Central Processing Unit (CPU) or a System on Chip (SoC), for example, and controls the functions of the application layer and the other layers of the smartphone 900. The memory 902 includes a Random Access Memory (RAM) and a Read Only Memory (ROM), and stores the program to be executed by the processor 901, and data. The storage 903 can include a storage medium such as a semiconductor memory or a hard disk. The external connection interface 904 is the interface for connecting an external device such as a memory card or a Universal Serial Bus (USB) device to the smartphone 900.

The camera 906 includes an imaging device such as a Charge Coupled Device (CCD) or a Complementary Metal Oxide Semiconductor (CMOS), and generates captured images. The sensor 907 may include a group of sensors, such as a location sensor, a gyro sensor, a geomagnetic sensor, and an acceleration sensor. The microphone 908 converts sound input to the smartphone 900 into a sound signal. The input device 909 includes a touch sensor that detects touching of the screen of the display device 910, a keypad, a keyboard, and buttons or switches, for example, and accepts an operation or information input from a user. The display device 910 has a screen such as a liquid crystal display (LCD) or an organic light emitting diode (OLED) display, and displays an image output from the smartphone 900. The speaker 911 converts a sound signal output from the smartphone 900 into sound.

The wireless communication interface 913 supports one or more of wireless LAN standards such as IEEE802.11a, 11b, 11g, 11n, 11ac, and 11ad, and conducts wireless communication. In infrastructure mode, the wireless communication interface 913 can communicate with another device via a wireless LAN access point. In ad-hoc mode or in direct communication mode such as Wi-Fi Direct, the wireless communication interface 913 can communicate directly with another device. In Wi-Fi Direct, one of the two terminals functions as an access point, which differs from the ad-hoc mode, but communication is performed directly between those terminals. The wireless communication interface 913 typically includes a baseband processor, an Radio Frequency (RF) circuit, a power amplifier, and the like. The wireless communication interface 913 may be a single-chip module formed by integrating a memory that stores a communication control program, a processor that executes the program, and other related circuits. The wireless communication interface 913 may support other kinds of wireless communication methods such as the near field communication method, the proximity wireless communication method, and the cellular communication method, as well as the wireless LAN method. The antenna switch 914 switches the connection destination of the antenna 915 between circuits included in the wireless communication interface 913 (such as circuits for different wireless communication methods). The antenna 915 includes one or more antenna elements (such as the antenna elements constituting a MIMO antenna), and is used for transmitting and receiving radio signals through the wireless communication interface 913.

The smartphone 900 is not limited to the example shown in FIG. 20, and may include more than one antenna (such as an antenna for wireless LAN and an antenna for the proximity wireless communication method). In such a case, the antenna switch 914 may be excluded from the structure of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to one another. The battery 918 supplies power to the respective blocks of the smartphone 900 shown in FIG. 20, via feed lines partially indicated by dashed lines in the drawing. The auxiliary controller 919 causes the minimum necessary functions of the smartphone 900 in sleep mode, for example.

In the smartphone 900 shown in FIG. 20, the control unit 240 described above with reference to FIG. 2, and the control unit 370 described above with reference to FIG. 3 may be implemented in the wireless communication interface 913. Alternatively, at least part of those functions may be implemented in the processor 901 or the auxiliary controller 919.

The smartphone 900 may also function as a wireless access point (software AP), as the processor 901 executes an access point function at the application level. Alternatively, the wireless communication interface 913 may have a wireless access point function.

[3-2. Second Application]

Figure 21:
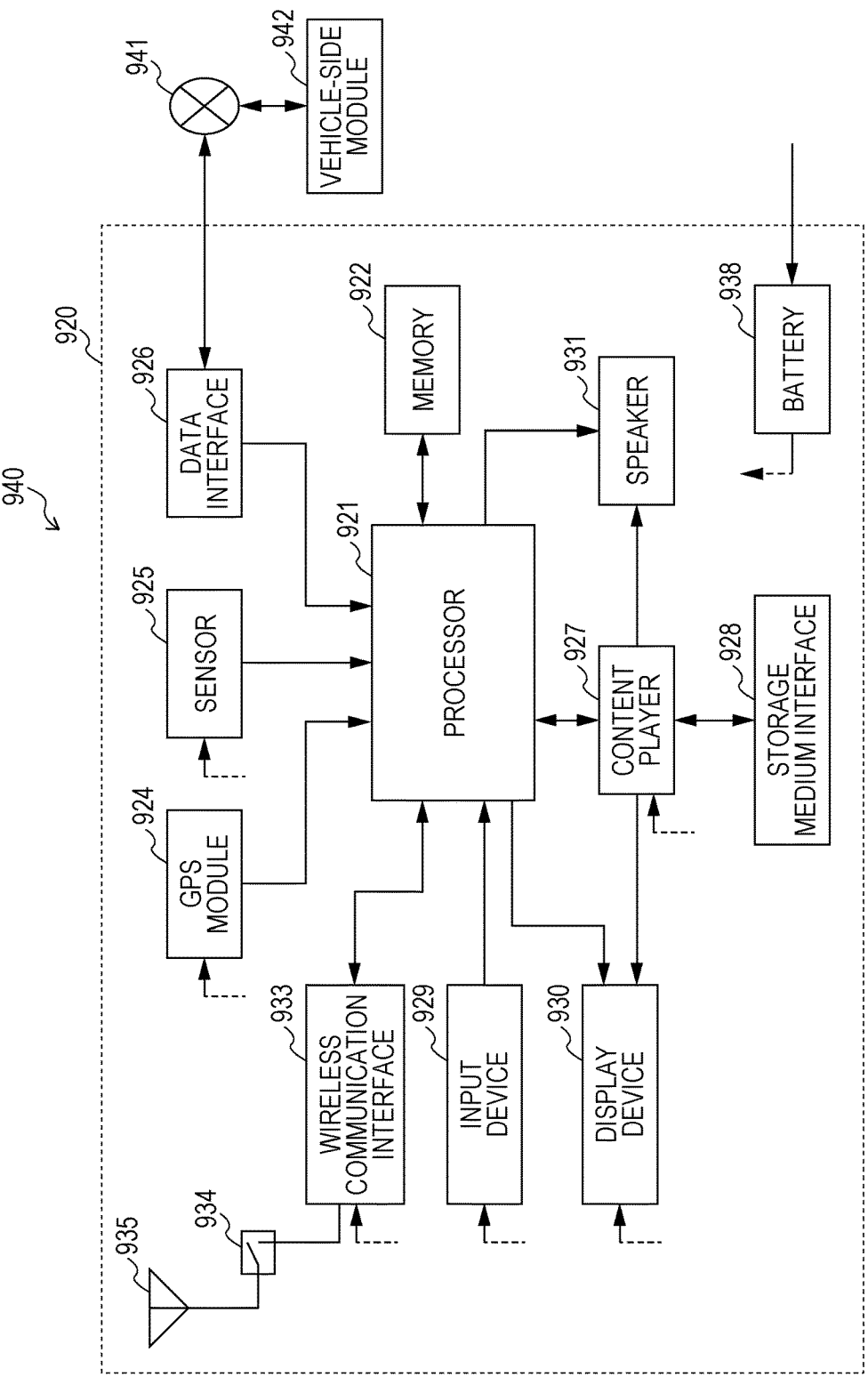
FIG. 21 is a block diagram schematically showing an example structure of a car navigation device.

FIG. 21 is a block diagram schematically showing an example structure of a car navigation device 920 to which the technology according to the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be a CPU or a SoC, for example, and controls the navigation function and the other functions of the car navigation device 920. The memory 922 includes a RAM and a ROM, and stores the program to be executed by the processor 921, and data.

The GPS module 924 measures the location (such as the latitude, the longitude, and the altitude) of the car navigation device 920, using a GPS signal received from a GPS satellite. The sensor 925 may include a group of sensors, such as a gyro sensor, a geomagnetic sensor, and an atmospheric pressure sensor. The data interface 926 is connected to an in-vehicle network 941 via a terminal (not shown), for example, and acquires data generated on the vehicle side, such as vehicle speed data.

The content player 927 reproduces content stored in a storage medium (such as a CD or a DVD) inserted into the storage medium interface 928. The input device 929 includes a touch sensor that detects touching of the screen of the display device 930, and buttons or switches, for example, and accepts an operation or information input from a user. The display device 930 has a screen such as an LCD or an OLED display, and displays the image of a navigation function or content being reproduced. The speaker 931 outputs the sound of a navigation function or content being reproduced.

The wireless communication interface 933 supports one or more of wireless LAN standards such as IEEE802.11a, 11b, 11g, 11n, 11ac, and 11ad, and conducts wireless communication. In infrastructure mode, the wireless communication interface 933 can communicate with another device via a wireless LAN access point. In ad-hoc mode or in direct communication mode such as Wi-Fi Direct, the wireless communication interface 933 can communicate directly with another device. The wireless communication interface 933 typically includes a baseband processor, an RF circuit, a power amplifier, and the like. The wireless communication interface 933 may be a single-chip module formed by integrating a memory that stores a communication control program, a processor that executes the program, and other related circuits. The wireless communication interface 933 may support other kinds of wireless communication methods such as the near field communication method, the proximity wireless communication method, and the cellular communication method, as well as the wireless LAN method. The antenna switch 934 switches the connection destination of the antenna 935 between circuits included in the wireless communication interface 933. The antenna 935 includes one or more antenna elements, and is used for transmitting and receiving radio signals through the wireless communication interface 933.

The car navigation device 920 is not limited to the example shown in FIG. 21, and may include more than one antenna. In such a case, the antenna switch 934 may be excluded from the structure of the car navigation device 920.

The battery 938 supplies power to the respective blocks of the car navigation device 920 shown in FIG. 21, via feed lines partially indicated by dashed lines in the drawing. The battery 938 also stores power supplied from the vehicle side.

In the car navigation device 920 shown in FIG. 21, the control unit 240 described above with reference to FIG. 2, and the control unit 370 described above with reference to FIG. 3 may be implemented in the wireless communication interface 933. Alternatively, at least part of those functions may be implemented in the processor 921.

Also, the technique according to the present disclosure may be embodied as an in-vehicle system (or a vehicle) 940 that includes one or more of the blocks of the above described car navigation device 920, the in-vehicle network 941, and a vehicle-side module 942. The vehicle-side module 942 generates vehicle-side data such as the number of revolutions of the engine or failure information, and outputs the generated data to the in-vehicle network 941.

The above described embodiments are examples for embodying the present technology, and there is a correspondence relationship between the matters in the embodiments and the matters of the inventions disclosed in the claims. Likewise, there is a correspondence relationship between the matters of the inventions disclosed in the claims and the matters in the embodiments of the present technology having the same names as those of the matters of the inventions. However the present technology is not limited to the above embodiments, and can be embodied by making various modifications to the above embodiments without departing from the scope of the technology.

The processing procedures described in the above described embodiments may be regarded as a method involving a series of those procedures, or as a program for causing a computer to carry out the series of those procedures, or as a recording medium storing the program. This recording medium may be a Compact Disc (CD), a MiniDisc (MD), a Digital Versatile Disc (DVD), a memory card, or a Blu-ray (registered trademark) Disc, for example.

The present technology may also be embodied in the structures described below.

(1)

An information processing device that receives a stream from another information processing device through wireless communication, the stream being for outputting image information, the information processing device including:

a wireless communication unit that performs communication with the another information processing device, the communication being for exchanging capability information about the information processing device and capability information about the another information processing device; and a control unit that performs control to set a power consumption mode in the another information processing device based on the capability information about the another information processing device.

(2)

The information processing device of (1), wherein the capability information about the another information processing device includes information indicating whether the another information processing device is a mobile device, and the control unit performs control to set a low power consumption mode in the another information processing device based on the capability information about the another information processing device and management information for managing the another information processing device.

(3)

The information processing device of (2), wherein the management information is information for managing identification information for identifying the another information processing device and the capability information about the another information processing device, the identification information and the capability information being connected to each other.

(4)

The information processing device of (3), wherein the management information includes, as the capability information about the another information processing device, at least information about radio wave propagation measurement related to communication with the another information processing device and information about power consumption.

(5)

The information processing device of (3) or (4), wherein the management information includes, as the capability information about the another information processing device, at least information about an output format for displaying the image information.

(6)

The information processing device of (5), wherein
the information about the output format is information indicating that the image information is of main display or of sub display, and,
when the output format is of the sub display, the control unit sets the low power consumption mode in the another information processing device.

(7)
The information processing device of (6), wherein, when switching between the main display and the sub display is performed, the another information processing device transmits information indicating timing of the switching to the information processing device.

(8)
The information processing device of one of (1) through (7), wherein the control unit performs control to set a mode for the another information processing device to transmit the stream while sleeping at predetermined intervals, the mode being set as the low power consumption mode.

(9)
The information processing device of one of (1) through (8), wherein the setting of a power consumption mode is performed with a predetermined RTSP message defined in the Wi-Fi Display specifications.

(10)
The information processing device of one of (1) through (9), wherein the wireless communication unit performs exchange of the capability information through capability negotiation or capability re-negotiation defined in the Wi-Fi Display specifications.

(11)
The information processing device of one of (1) through (10), wherein the capability information is exchanged in a RTSP M3 Message in capability negotiation or capability re-negotiation.

(12)
The information processing device of one of (1) through (11), wherein
the wireless communication unit is a wireless communication unit that performs communication using a first frequency band, and communication using a second frequency band, the second frequency band having a higher data transmission rate than the first frequency band, and
the control unit sets a first power consumption mode for the first frequency band and a second power consumption mode for the second frequency band independently of each other.

(13)
The information processing device of one of (1) through (12), wherein, when the management information is changed, the control unit performs control to transmit a command to the another information processing device, the command being for notifying the another information processing device of the change.

(14)
The information processing device of (13), wherein the control unit performs control to transmit a RTSPM5 Message as the command to the another information processing device, the RTSPM5 Message containing wfd-triggered-method defined in the Wi-Fi CERTIFIED Miracast specifications.

(15)
An information processing device that receives a stream from another information processing device through wireless communication, the stream being for outputting image information, the information processing device performing control to set a power consumption mode in the another information processing device based on an output format of an output unit, the output unit outputting the image information based on the stream.

(16)
An information processing device that transmits a stream to another information processing device through wireless communication, the stream being for outputting image information,
the information processing device including:
a wireless communication unit that performs communication with the another information processing device, the communication being for exchanging capability information about the information processing device and capability information about the another information processing device; and
a control unit that sets a power consumption mode under the control of the another information processing device based on the capability information about the information processing device.

(17)
An information processing method for receiving a stream from another information processing device through wireless communication, the stream being for outputting image information,
the information processing method including:
a wireless communication step of performing communication with the another information processing device, the communication being for exchanging capability information about the information processing device and capability information about the another information processing device; and
a control step of performing control to set a power consumption mode in the another information processing device based on the capability information about the another information processing device.

REFERENCE SIGNS LIST

100 Communication system
101 Information transmission range
200 Information processing device
201 Data transmission system
202 Line control system
210 Antenna
220 Wireless communication unit
230 Control signal receiving unit
240 Control unit
250 Image/sound signal generating unit
260 Image/sound compressing unit
270 Stream transmitting unit
300 Information processing device
301 Line control system
302 Input/output system
310 Antenna
320 Wireless communication unit
330 Stream receiving unit
340 Image/sound decompressing unit
350 Image/sound output unit
351 Display unit
352 Sound output unit
360 User information acquiring unit
370 Control unit
380 Control signal transmitting unit
390 Management information holding unit
400 Information processing device 700 Communication system
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation device
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle-side module

The invention claimed is:

1. A first information processing device, comprising:
    circuitry configured to:
        receive a video stream from a second information processing device via wireless communication;
        receive, from the second information processing device, a Real Time Streaming Protocol (RTSP) request to obtain first capability information of the first information processing device;
        transmit a RTSP response that includes the first capability information to the second information processing device;
        set setting information to the first capability information in the RTSP response, wherein the setting information requests the second information processing device to output the video stream that includes audio data or excludes the audio data;
        set a low power consumption mode in the second information processing device based on the request to output the video stream that excludes the audio data,
            wherein the video stream that excludes the audio data is output by the second information processing device in response to reception of the first capability information including the setting information that requests the second information processing device to output the video stream that excludes the audio data; and
        receive, from the second information processing device, the video stream that excludes the audio data.

2. The first information processing device according to claim 1, wherein the circuitry is further configured to:
    set second capability information in the RTSP response, wherein the second capability information of the second information processing device indicates that the second information processing device is a mobile device, and
    set the low power consumption mode in the second information processing device based on the second capability information and management information for management of the second information processing device.

3. The first information processing device according to claim 2,
    wherein the management information is related to management of identification information of the second information processing device and the second capability information, and
    wherein the identification information is associated with the second capability information.

4. The first information processing device according to claim 3,
    wherein the management information includes, as the second capability information, at least one of first information about radio wave propagation measurement of the wireless communication or second information about power consumption by the second information processing device, and
    wherein the wireless communication is between the first information processing device and the second information processing device.

5. The first information processing device according to claim 3, wherein the management information includes, as the second capability information, at least third information of an output format to display image information.

6. The first information processing device according to claim 5, wherein
    the third information indicates that the image information is one of a main display or a sub-display, and
    the circuitry is further configured to set the low power consumption mode in the second information processing device based on the output format that indicates the sub-display.

7. The first information processing device according to claim 6,
    wherein the second information processing device transmits timing information to the first information processing device based on a switching process between the main display and the sub-display, and
    wherein the timing information indicates a time associated with the switching process.

8. The first information processing device according to claim 2,
    wherein at least one component of the second information processing device sleeps for a time interval in the low power consumption mode of the second information processing device.

9. The first information processing device according to claim 2,
    wherein the circuitry is further configured to transmit a command to the second information processing device based on a change of the management information, and
    wherein the command is to notify the change of the management information to the second information processing device.

10. The first information processing device according to claim 9, wherein the circuitry is further configured to transmit a RTSP Message as the command to the second information processing device, and wherein the RTSP Message contains a Wi-Fi display (wfd)-triggered-method defined in Wi-Fi CERTIFIED Miracast specifications.

11. The first information processing device according to claim 1, wherein the circuitry is further configured to set a power consumption mode with a RTSP message defined in Wi-Fi Display specifications.

12. The first information processing device according to claim 1, wherein the circuitry is further configured to exchange the first capability information and second capability information through one of capability negotiation or capability re-negotiation, and wherein the capability negotiation and the capability re-negotiation are defined in Wi-Fi Display specifications.

13. The first information processing device according to claim 1, wherein the first capability information and second capability information are exchangeable in a RTSP Message in at least one of capability negotiation or capability re-negotiation.

14. The first information processing device according to claim 1, wherein the circuitry is further configured to:

communicate with the second information processing device based on one of a first frequency band or a second frequency band, wherein a first data transmission rate of the second frequency band is higher than a second data transmission rate of the first frequency band, and set one of a first power consumption mode for the first frequency band or a second power consumption mode for the second frequency band.

15. The first information processing device according to claim 1, wherein the circuitry is further configured to:

output first audio data associated with a main image at a first volume and output second audio data associated with a sub-image at a second volume different from the first volume, and wherein the first audio data and the second audio data are output based on the setting information that requests the second information processing device to output the video stream that includes the audio data.

16. The first information processing device according to claim 1, wherein the circuitry is further configured to set the low power consumption mode in the second information processing device based on the second information processing device is a mobile device.

17. A first information processing device, comprising:
circuitry configured to:
receive a video stream that excludes audio data from a second information processing device via wireless communication,
wherein the video stream is received based on capability information of the first information processing device,
wherein the capability information comprises setting information that requests the second information processing device to output the video stream that excludes the audio data, and wherein the capability information is included in a Real Time Streaming Protocol (RTSP) message transmitted from the first information processing device to the second information processing device; and set a low power consumption mode in the second information processing device based on the request to output the video stream that excludes the audio data.

18. A first information processing device, comprising:
circuitry configured to:
transmit, to a second information processing device, a Real Time Streaming Protocol (RTSP) request to obtain capability information of the second information processing device;
receive a RTSP response that includes the capability information from the second information processing device,
wherein the capability information requests the first information processing device to output a video stream that includes audio data or excludes the audio data, and
wherein a low power consumption mode is set in the first information processing device based on the request to output the video stream that excludes the audio data; and
transmit, to the second information processing device, the video stream that excludes the audio data in response to reception of the capability information that requests the first information processing device to output the video stream that excludes the audio data.

19. An information processing method, comprising:
in a first information processing device:
receiving a video stream from a second information processing device via wireless communication;
receiving, from the second information processing device, a Real Time Streaming Protocol (RTSP) request to obtain capability information of the first information processing device;
transmitting a RTSP response that includes the capability information to the second information processing device;
setting information to the capability information in the RTSP response, wherein the information requests the second information processing device to output the video stream that includes audio data or excludes the audio data;
setting a low power consumption mode in the second information processing device based on the request to output the video stream that excludes the audio data,
wherein the video stream that excludes the audio data is output by the second information processing device in response to reception of the capability information including the information that requests the second information processing device to output the video stream that excludes the audio data; and
receiving, from the second information processing device, the video stream that excludes the audio data.

* * * * *